(12) United States Patent
Nakagawa et al.

(10) Patent No.: US 11,995,077 B2
(45) Date of Patent: May 28, 2024

(54) PARAMETER OPTIMIZATION APPARATUS, METHOD, AND SYSTEM

(71) Applicant: KABUSHIKI KAISHA TOSHIBA, Tokyo (JP)

(72) Inventors: Hideyuki Nakagawa, Kawasaki (JP); Yasunori Taguchi, Kawasaki (JP); Hiro Gangi, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 160 days.

(21) Appl. No.: 17/446,325

(22) Filed: Aug. 30, 2021

(65) Prior Publication Data

US 2022/0138194 A1 May 5, 2022

(30) Foreign Application Priority Data

Nov. 5, 2020 (JP) .................................. 2020-185291

(51) Int. Cl.
| | | |
|---|---|---|
| G06F 16/245 | (2019.01) | |
| G06F 3/0482 | (2013.01) | |
| G06F 16/22 | (2019.01) | |
| G06F 16/2453 | (2019.01) | |

(52) U.S. Cl.
CPC ...... *G06F 16/24532* (2019.01); *G06F 3/0482* (2013.01); *G06F 16/2264* (2019.01)

(58) Field of Classification Search
CPC ....................... G06F 16/24532; G06F 16/2264
See application file for complete search history.

(56) References Cited

U.S. PATENT DOCUMENTS

| | | | |
|---|---|---|---|
| 2019/0377611 A1* | 12/2019 | Khan | ............... G06Q 10/06315 |
| 2020/0050717 A1 | 2/2020 | Kiribuchi et al. | |
| 2022/0171990 A1 | 6/2022 | Yokoyama | |

FOREIGN PATENT DOCUMENTS

| | | |
|---|---|---|
| JP | 2020-027370 A | 2/2020 |
| JP | 2020-144530 | 9/2020 |

OTHER PUBLICATIONS

Kirschner et al., "Adaptive and Safe Bayesian Optimization in High Dimensions via One-Dimensional Subspaces", Proceedings of the 36th International Conference on Machine Learning, vol. 97, PMLR, 2019, pp. 3429-3438.

Ohta, Takeru, "Reducing Bayesian Optimization Computation Based on Sample Point Limits and Restart Strategies," Preferred Networks Research & Development, Oct. 24, 2019, with computer generated English Translation.

* cited by examiner

*Primary Examiner* — Baoquoc N To
(74) *Attorney, Agent, or Firm* — Oblon, McClelland, Maier & Neustadt, L.L.P.

(57) ABSTRACT

According to one embodiment, a parameter optimization apparatus stores data sets which each include a first parameter value of a first number of dimensions and an observed value of an objective function corresponding to the first parameter value. The apparatus determines a search space of a second number of dimensions smaller than the first number of dimensions. The apparatus acquires one or more data sets each having a first parameter value present within a predetermined distance from the search space. The apparatus searches the search space for a first parameter value that may optimize the objective function, using a surrogate model of an objective function based on one or more data sets acquired.

25 Claims, 11 Drawing Sheets

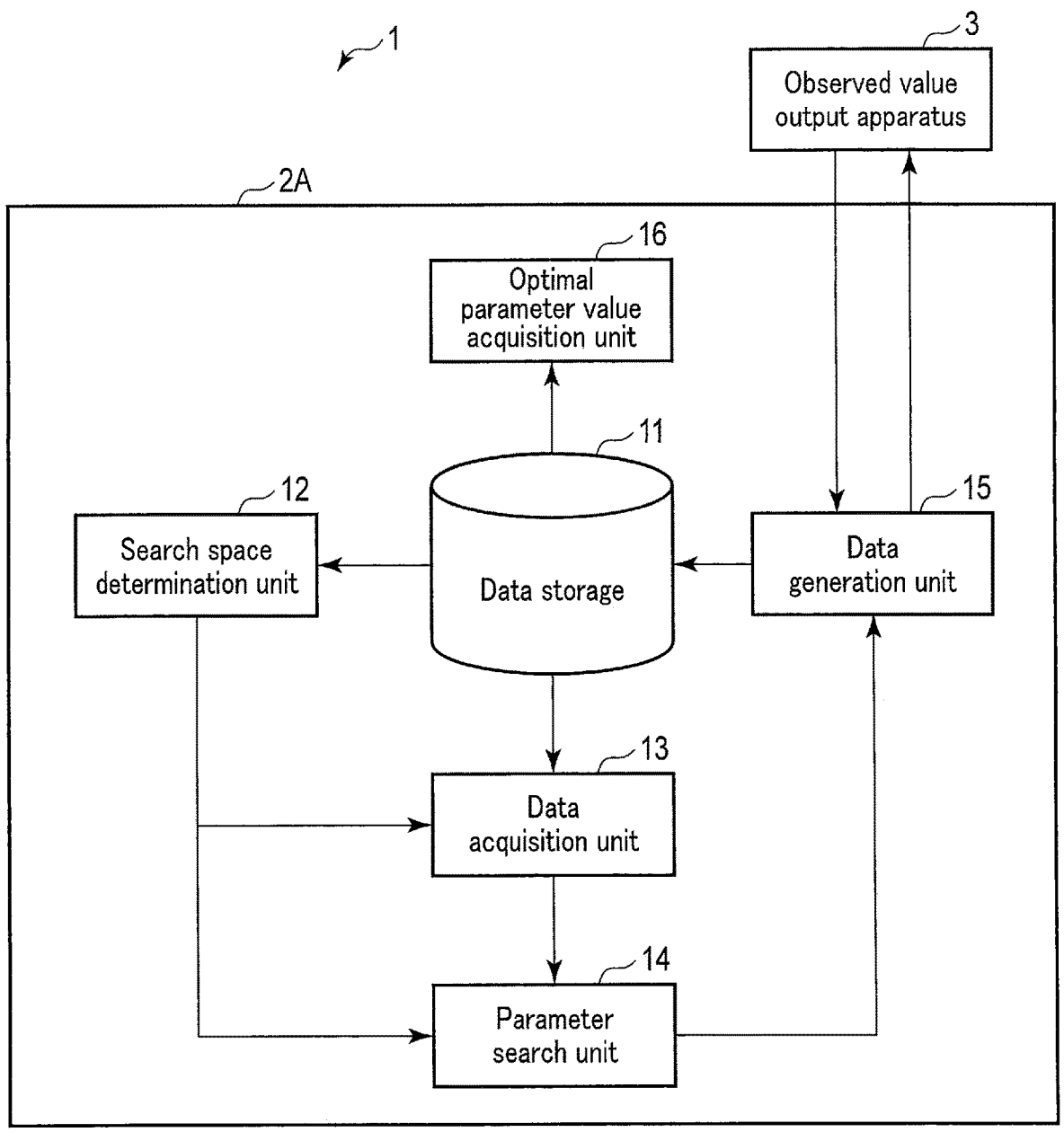
F I G. 1

| x(0) | x(1) | x(2) | x(3) | ... | x(17) | x(18) | x(19) | y |
|------|------|------|------|-----|-------|-------|-------|------|
| 0.967 | 1.322 | 0.950 | 0.632 | ... | 1.141 | 1.116 | 1.525 | 1.989 |
| 0.868 | 1.322 | 0.950 | 0.632 | ... | 1.141 | 1.116 | 1.525 | 1.875 |
| 0.868 | 0.745 | 0.950 | 0.632 | ... | 1.141 | 1.116 | 1.525 | 2.507 |
| 0.868 | 0.745 | 1.568 | 0.632 | ... | 1.141 | 1.116 | 1.525 | 1.876 |
| ... | ... | ... | ... | ... | ... | ... | ... | ... |
| 0.777 | 1.557 | 0.810 | 0.451 | ... | 0.998 | 0.643 | 1.34 | 0.773 |

Data set (rows 1–4), Data set (row 5)

FIG. 2

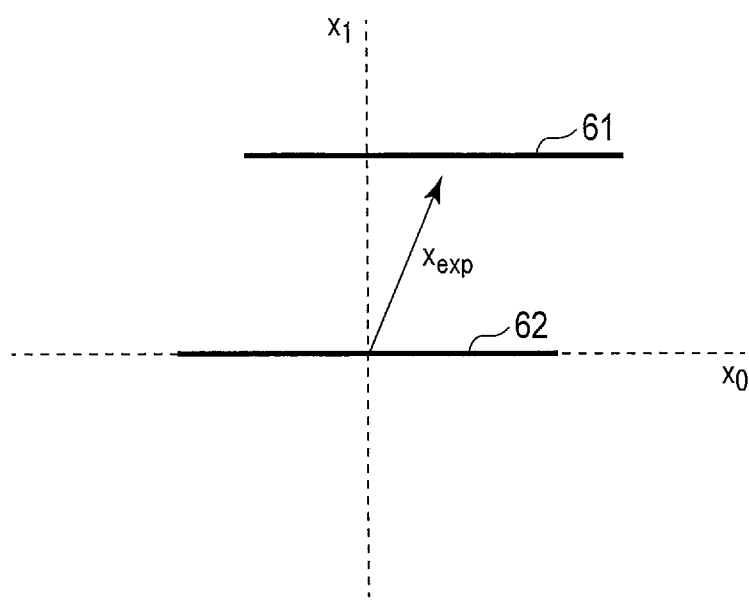
F I G. 8

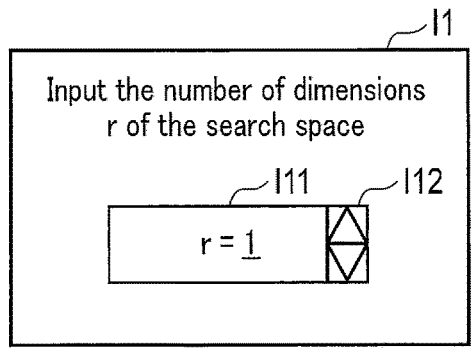
F I G. 11
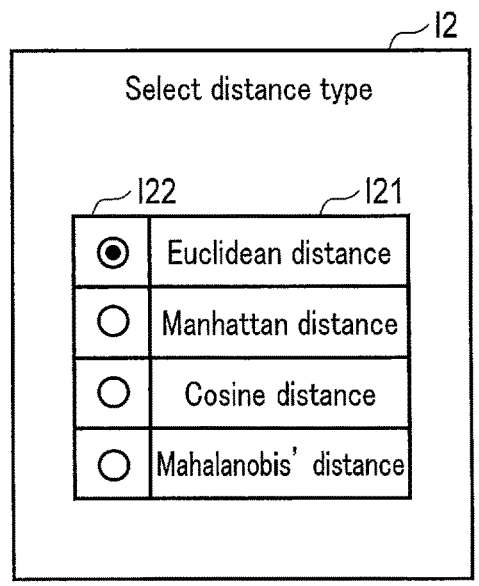
F I G. 12
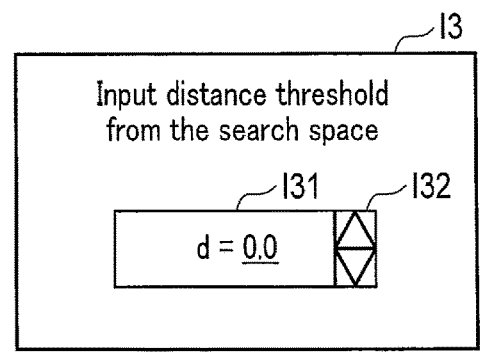
F I G. 13

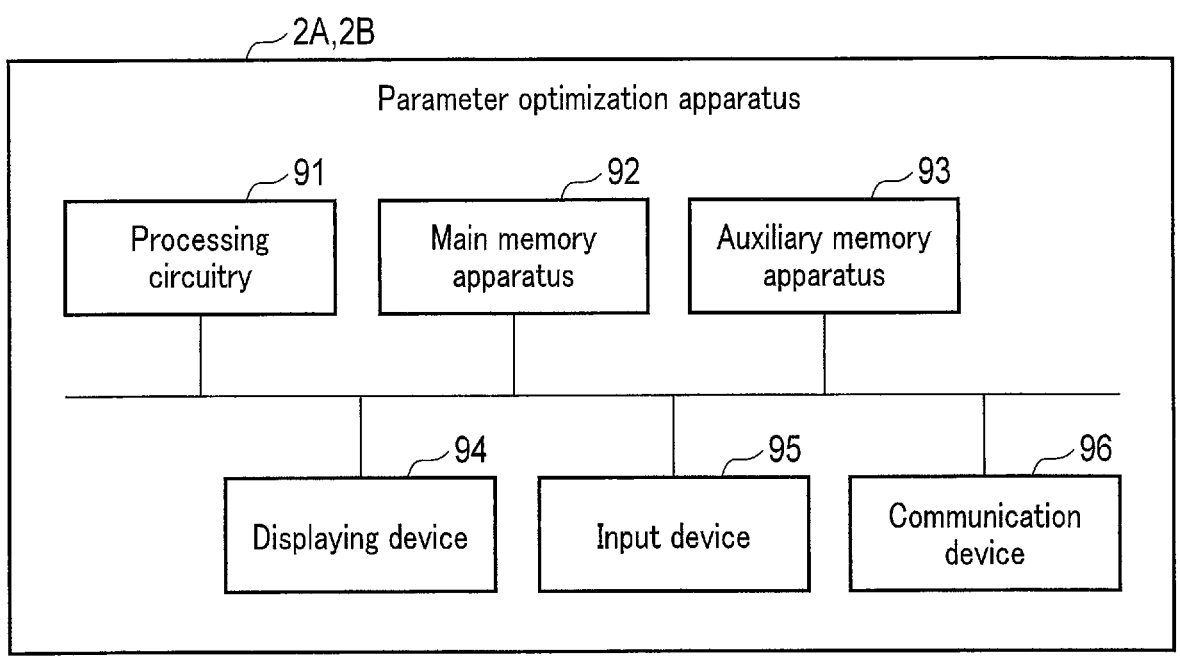
F I G. 14

PARAMETER OPTIMIZATION APPARATUS, METHOD, AND SYSTEM

CROSS-REFERENCE TO RELATED APPLICATIONS

This application is based upon and claims the benefit of priority from Japanese Patent Application No. 2020-185291, filed Nov. 5, 2020, the entire contents of which are incorporated herein by reference.

FIELD

Embodiments described herein relate generally to a parameter optimization apparatus, method, and system.

BACKGROUND

Our society plays host to various types of devices, each of which consists of various components which are designed, manufactured, and used.

There are cases in which devices and components have their characteristics designed to satisfy specifications. In these cases, simulations, experiments, or questionnaire surveys are conducted for parameters adjustable and varied during the design phase, characteristics of a device or a component designed with those parameter values are thereby acquired, and parameter values within which these characteristics satisfy specifications are determined in turn. Herein, the characteristics are, for example, performance, manufacturing cost, and customer satisfaction of a device or component. Superior performance, lower manufacturing cost, and higher customer satisfaction of devices and components are more preferable. In a case where greater characteristics values are more preferable, it is demanded that a parameter value maximizing those characteristics be determined in a shorter time and with less work involved. In a case where smaller characteristic values are preferable, it is demanded a parameter value minimizing those characteristics be determined in a shorter time and with less work involved.

The act of determining a parameter value that maximizes or minimizes characteristics is called "parameter optimization". Characteristics that change according to a parameter value are called an "objective function". Simulations, experiments, and questionnaire surveys are all means for observing values of an objective function.

Parameter optimization may be performed even during the manufacturing phase. For example, there is a case where a parameter value maximizing manufacturing yields is determined and another case where a parameter minimizing post-shipment failure rates is determined.

Parameter optimization may be performed even during the use phase. For example, there is a case where a parameter value that enables a device or a component delivered to a user to exhibit performance suitable for the user's usage environment is determined at the user's initial setting.

In most cases, more than one parameter is determined. If the number of parameters to be adjusted is denoted by D, multiple parameters can be expressed as a D-dimensional vector. Hereinafter, a parameter that can be expressed as a D-dimensional vector will be called a "D-dimensional parameter", and a value of a D-dimensional parameter will be called a "D-dimensional parameter value". A space for searching for an optimal D-dimensional parameter value is a D-dimensional space. Since a great D requires a large search space, optimization becomes complicated.

In a D-dimensional space ($D \geq 2$), the method disclosed in Non-Patent Document 1 is known as a parameter optimization method for searching for a D-dimensional parameter value that maximizes or minimizes an objective function. With this method, a search space is limited to a one-dimensional search space in a D-dimensional space, and Bayesian optimization is iterated while switching a one-dimensional search space to another to search for a parameter value. The efficiency in the search for a D-dimensional parameter value is thereby increased.

The Bayesian optimization utilized by the method in the non-patent literature (J. Kirschner, M. Mutny, N. Hiller, R. Ischebeck, and A. Krause,"Adaptive and safe Bayesian optimization in high dimensions via one-dimensional subspaces," in Proceedings of the 36th International Conference on Machine Learning, vol. 97, pp. 3429-3438, PMLR, 2019) requires the calculation of the inverse matrix, and the amount of calculation increases with the number of iterations of the parameter search. Even though it takes a long time to observe the value of the objective function, such as in simulations, experiments, and questionnaire surveys, the amount of computation when the number of iterations of the parameter search increases may also become non-negligible.

BRIEF DESCRIPTION OF THE DRAWING(S)

FIG. 1 is a diagram showing a functional configuration example of a parameter optimization system according to a first embodiment.

FIG. 2 is a diagram showing an example of data sets stored in a data storage.

FIG. 8 is a diagram showing an example of a one-dimensional affine subspace.

FIG. 11 is a diagram showing an example of a dimension acquisition screen.

FIG. 12 is a diagram showing an example of a distance type input screen. FIG. 13 is a diagram showing an example of a threshold input screen.

FIG. 14 is a diagram showing a hardware configuration example of a parameter optimization apparatus.

DETAILED DESCRIPTION

Figure 3:
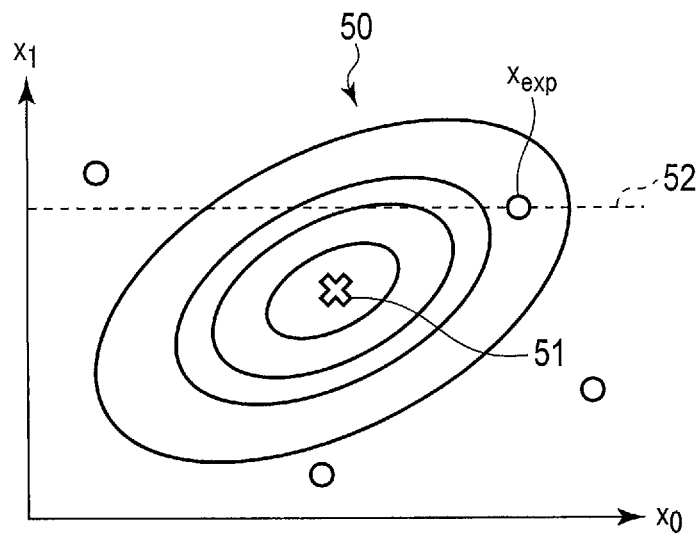
FIG. 3 is a diagram showing an example of a one-dimensional search space in a two-dimensional parameter space.

In general according to one embodiment, a parameter optimization apparatus includes a storage, a search space determination unit, a first acquisition unit, and a parameter search unit. The storage stores a plurality of data sets which each include first parameter value of a first number of dimensions and an observed value of an objective function corresponding to the first parameter value. The search space determination unit determines a search space of a second number of dimensions that includes a predetermined first parameter value, the second number being smaller than the first number of dimensions. The first acquisition unit acquires one or more data sets each having a first parameter value present within a predetermined distance from the search space, or a data set having a second parameter value corresponding to this data set, based on the plurality of data sets. The parameter search unit searches the search space for a first parameter value or a second parameter value that may optimize the objective function, using a surrogate model of the objective function based on the one or more data sets acquired.

The terms used in the present embodiment are defined as follows. D is the number of parameters targeted for adjustment. D parameters can be expressed as a D-dimensional vector. Hereinafter, a parameter that can be expressed as a D-dimensional vector will be called a "D-dimensional parameter", and a value of a D-dimensional parameter will be called a "D-dimensional parameter value". A D-dimensional parameter value is denoted by x. An objective function targeted for optimization is denoted by $f(\cdot)$, and an observed value of the objective function is denoted by y. A parameter value of r-dimension is expressed as $x^r$. The relationship D>r is held.

To determine a D-dimensional parameter value that maximizes a value of an objective function, the relevant maximization problem can be treated as an equivalent minimization problem by inverting the sign of the objective function. Accordingly, hereinafter, an example wherein a D-dimensional parameter value that minimizes a value of an objective function $f(\cdot)$ is determined will be described, and explanations of a maximization problem will be omitted.

Hereinafter, a parameter optimization apparatus, method, and system according to embodiments will be described with reference to the drawings. In the following descriptions, configurations and operations characteristics to a parameter optimization apparatus will be mainly described, but a parameter optimization apparatus according to the embodiments may include configurations or operations for which explanations are omitted.

First Embodiment

FIG. 1 is a diagram showing a functional configuration example of a parameter optimization system 1 according to the first embodiment. As shown in FIG. 1, the parameter optimization system 1 is a computer system having a parameter optimization apparatus 2A and an observed value output apparatus 3. The parameter optimization apparatus 2A and the observed value output apparatus 3 are communicably coupled to each other via wires or wirelessly. The parameter optimization apparatus 2A is a computer configured to search for a parameter value having a potential for optimizing an objective function, based on an observed value from the observed value output apparatus 3 and a parameter value corresponding thereto. The observed value output apparatus 3 is a computer configured to conduct simulations, experiments, or questionnaire surveys based on a parameter value and observe a value of an objective function, in other words, a computer configured to output an observed value of an objective function. The parameter optimization system 1, with use of the observed value output apparatus 3, iterates the search conducted by the parameter optimization apparatus 2A for a parameter value having a potential to optimize an objective function and the output of an observed value of an objective function corresponding to the searched parameter value.

As shown in FIG. 1, the parameter optimization apparatus 2A has, for example, a data storage 11, a search space determination unit 12, a data acquisition unit 13, a parameter search unit 14, a data generation unit 15, and an optimal parameter value acquisition unit 16.

The data storage 11 stores, as data, a set of a D-dimensional parameter value and an observed value of an objective function corresponding to the D-dimensional parameter value. Data as a set of a D-dimensional parameter value and an observed value will be called a "data set". The data storage 11 stores one or more data sets. An observed value of an objective function is calculated by the observed value output apparatus 3 based on a D-dimensional parameter value.

Assume that the data storage 11 stores $N_0$ data sets $\{(x_n, y_n)|n=0, 1, \ldots, N_0-1\}$. Herein, $x_n$ represents a n-th D-dimensional parameter value. $y_n$ represents an observed value of an objective function $f$ of $x_n$. In other words, $y_n=f(x_n)+\varepsilon_n$. Herein, $\varepsilon_n$ represents a noise component included in the observed value $y_n$. The number of data sets, $N_0$ may increase when a data set generated by the data generation unit 15 is stored in the data storage 11.

The observed value $y_n$ is observed based on simulations, experiments, questionnaire surveys, etc. conducted by the observed value output apparatus 3. In those experiments, simulations, questionnaire surveys, etc., characteristic values for one or more items are obtained. If the number of items is one, a characteristic value to be obtained is a scalar; for this reason, this characteristic value is used as an observed value of an objective function. If there are two or more items for which the characteristic values are obtained through experiments, simulations, questionnaire surveys, etc., these obtained characteristic values are expressed by a vector. A scalar obtained by converting a characteristic value expressed as a vector is used as an observed value of an objective function. To convert a vector into a scalar, linear weighted summation, etc. is used, for example.

FIG. 2 is a diagram showing an example of a data set stored in the data storage 11. FIG. 2 shows an example of data sets when D=20. A 20-dimensional parameter has 20 variables $x_{(0)}, x_{(1)}, \ldots, x_{(19)}$, and each variable has a unique value. Each variable may be a design parameter of a filter or a device, or a setting parameter of a manufacturing device. A value of each variable may be a consecutive value, a discrete value, or a category variable. Herein, a variable of an observed value of an objective function calculated from a 20-dimensional parameter value is defined as y. Each row in FIG. 2 corresponds to a data set having a 20-dimensional parameter value and an observed value of an objective function corresponding to the 20-dimensional parameter value.

The search space determination unit 12 acquires, from the data sets stored in the data storage 11, a D-dimensional parameter value $x_{exp}$ with which the observed value of the objective function has a minimum value, selects r-dimension parameters from the D-dimensional parameters, wherein r-dimensions is lower than D-dimensions, and determines an r-dimensional search space that includes the acquired D-dimensional parameter value. If no data sets are stored in the data storage 11, a D-dimensional parameter value $x_{exp}$ may be randomly set, or a past adjustment result may be used. The search space is an affine subspace. The number of dimensions r may be either a predetermined number or a randomly-determined number.

FIG. 3 is a diagram showing an example of a one-dimensional search space in a two-dimensional parameter space. That is, FIG. 3 shows an example when D=2 and r=1. The two-dimensional parameter space shown in FIG. 3 is a space defined by the coordinate axis $x_0$ and the coordinate axis $x_1$. The contour diagram 50 depicts a two-dimensional objective function in the two-dimensional parameter space. The center 51 of the contour diagram 50 corresponds to a minimum value of the objective function. Four points depict four two-dimensional parameter values. Of these two-dimensional parameter values, one in which the observed value of the objective function has a minimum value is marked as $x_{exp}$. The two-dimensional parameter value $x_{exp}$ is a reference point in the one-dimensional search space 52. To determine a one-dimensional search space 52, it is necessary to select one dimension to be focused upon; in FIG. 3, $x_0$ is selected as the one dimension to be focused upon, for example. The search space determination unit 12 determines a one-dimensional space which includes the two-dimensional parameter value $x_{exp}$ and is along $x_0$ as a one-dimensional search space 52. Through this method of selecting a dimension, an optimization problem of high degree-dimensional parameters can be solved through being broken down into an optimization problem of low degree-dimensional parameters.

The data acquisition unit 13 acquires a data set having a D-dimensional parameter value included within a predetermined distance from the search space acquired from the search space determination unit 12, based on the plurality of data sets stored in the data storage 11. A data set having a D-dimensional parameter value included within a predetermined distance from the search space is hereinafter called a "data set in the vicinity of the search space". The distance between a search space and a D-dimensional parameter value is preferably selected from among the Euclidean distance, the Manhattan distance, the cosine distance, and the Mahalanobis' distance, as appropriate. A cosine distance is obtained by a subtraction of a cosine similarity from 1. Although the cosine distance does not satisfy a mathematical axiom of distance, it can be used as a scale for measuring a distance from a search space. A data set acquired by the data acquisition unit 13 may be either a set of a D-dimensional parameter value and an observed value or a set of an r-dimensional parameter value and an observed value.

Figure 4:
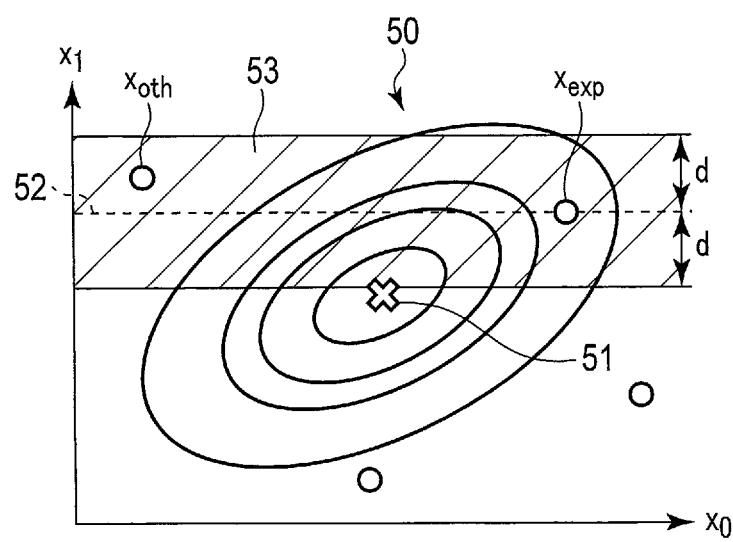
FIG. 4 is a diagram showing a concept of data sets in the vicinity of a one-dimensional search space, in a two-dimensional parameter space.

FIG. 4 is a diagram showing a concept of a data set in the vicinity of the one-dimensional search space, in the two-dimensional parameter space. That is, FIG. 4 shows an example when D=2 and r=1. A two-dimensional parameter value in the vicinity of the one-dimensional search space is a two-dimensional parameter value within a predetermined distance of a threshold d or less from the one-dimensional search space 52. In other words, two-dimensional parameter values $x_{exp}$ and $x_{oth}$ included in a space 53 within a distance of a threshold d or less from the one-dimensional search space 52 are acquired. The two-dimensional parameter value $x_{oth}$ is included in the space 53 but not in the one-dimensional search space 52. When d=0, a two-dimensional parameter value in the vicinity of the one-dimensional search space means a two-dimensional parameter value on the one-dimensional search space 51. Of the four points in FIG. 4, $x_{exp}$ is only two-dimensional parameter value on the one-dimension search space 51. When d=0, the two-dimensional parameter value $x_{oth}$ is not acquired by the data acquisition unit 13.

The data acquisition unit 13 may select a data set in the vicinity of the search space from the plurality of data sets stored in the data storage 11, or may generate a data set based on these data sets. The data acquisition unit 13 may convert the data set having the D-dimensional parameter value in the vicinity of the searched space acquired from the data storage 11 into a data set of an r-dimensional parameter value and an observed value of an objective function corresponding to the r-dimensional parameter value. The D-dimensional parameter value in the vicinity of the search space or the r-dimensional parameter value may be randomly generated, and a data set may be randomly generated based on the parameter value.

Figure 5:
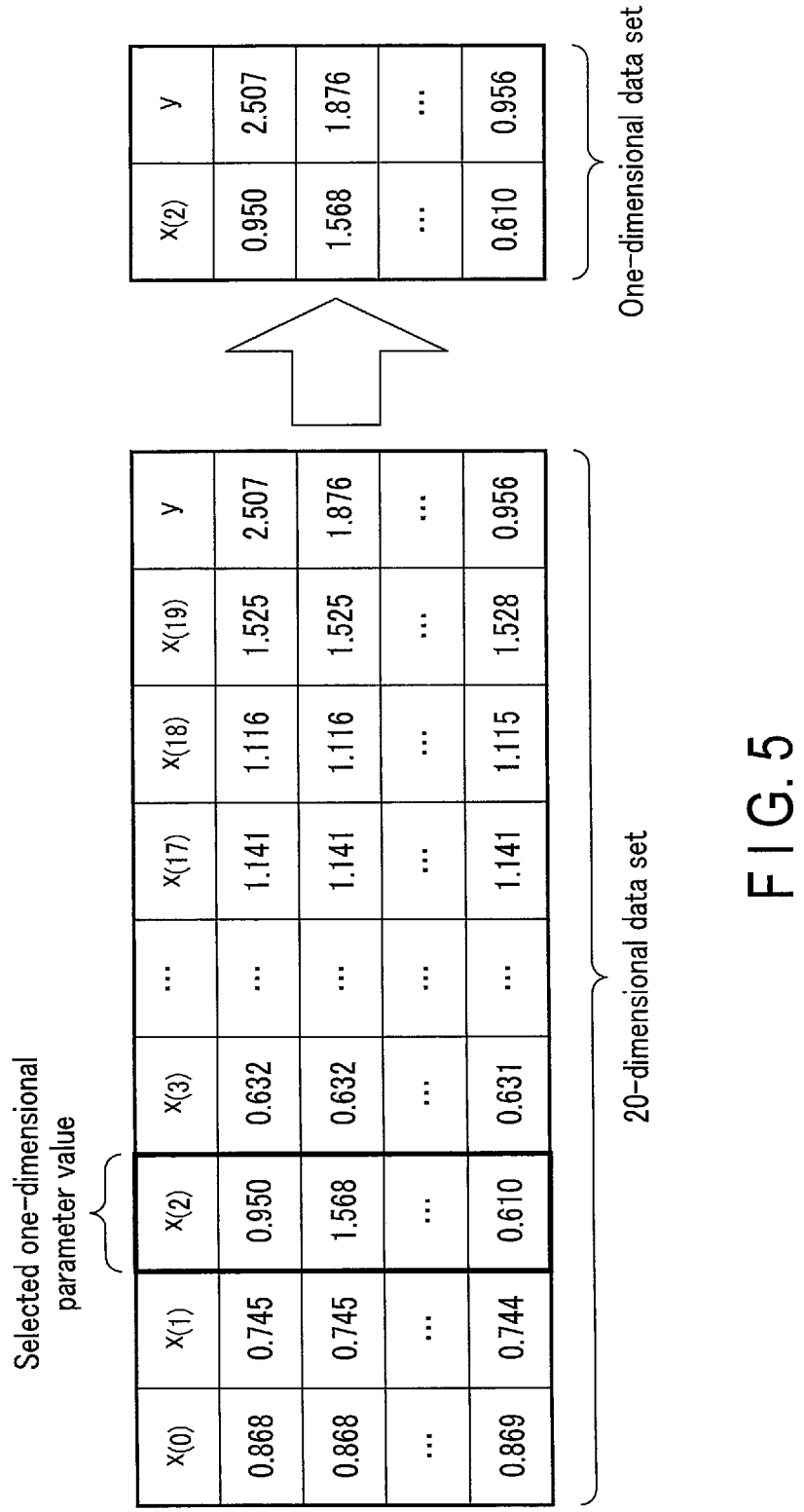
FIG. 5 is a diagram showing an example of a method of converting 20-dimensional data sets into one-dimensional data sets.

FIG. 5 is a diagram showing an example of a method of converting 20-dimensional data sets into one-dimensional data sets. That is, FIG. 5 shows an example when D=20 and r=1. FIG. 5 shows an example where the one-dimensional parameter selected in the search space determination unit 12 is $x_{(2)}$, and the left part of FIG. 5 shows 20-dimensional data sets in the vicinity of the one-dimensional search space acquired from the data storage 11. This conversion of 20-dimensional data sets into one-dimensional data sets is conducted through, for example, converting the one-dimensional parameter $x_{(2)}$ and the observed value y of the objective function selected by the search space determination unit 12 into data as a set.

The parameter search unit 14 determines D-dimensional parameter value $x_{next}$ that may optimize the objective function within the search space determined by the search space determination unit 12 or r-dimensional parameter value $x^r_{next}$, using a surrogate model of an objective function based on one or more data sets acquired by the data acquisition unit 13. Specifically, the parameter search unit 14 generates a surrogate model of an objective function based on the acquired data set, and either the D-dimensional parameter value or the r-dimensional parameter value within the r-dimensional search space that optimizes the surrogate model is searched as the D-dimensional parameter value $x_{next}$ or r-dimensional parameter value $x^r_{next}$ that may optimize the objective function. If the parameter value of the data set acquired from the data acquisition unit 13 is D-dimensions, D-dimensional parameter value $x_{next}$ is searched. On the other hand, if a parameter value of the data set acquired from the data acquisition unit 13 is r-dimensions, r-dimensional parameter value $x^r_{next}$ is searched. To search for a parameter value, Bayesian optimization, etc. may be adopted.

The data generation unit 15 generates a data set that includes an observed value $y_{next}$ of an objective function corresponding to D-dimensional parameter value $x_{next}$ or r-dimensional parameter value $x^r_{next}$ searched by the parameter search unit 14, and this D-dimensional parameter value $x_{next}$ or r-dimensional parameter value $x^r_{next}$.

Specifically, when D-dimensional parameter value $x_{next}$ is searched by the parameter search unit 14, the data generation unit 15 inputs the D-dimensional parameter value $x_{next}$ to the observed value output apparatus 3. The observed value output apparatus 3 conducts simulations, experiments, or questionnaire surveys and outputs an observed value $y_{next}$ based on the D-dimensional parameter value $x_{next}$. The data generation unit 15 acquires the observed value $y_{next}$ from the observed value output apparatus 3, generates a data set that includes the D-dimensional parameter value $x_{next}$ and the observed value $y_{next}$ and causes the data storage 11 to store the data set. When r-dimensional parameter value $x^r_{next}$ is searched by the parameter search unit 14, the data generation unit 15 converts the r-dimensional parameter value $x^r_{next}$ into D-dimensional parameter value $x_{next}$.

Figure 6:
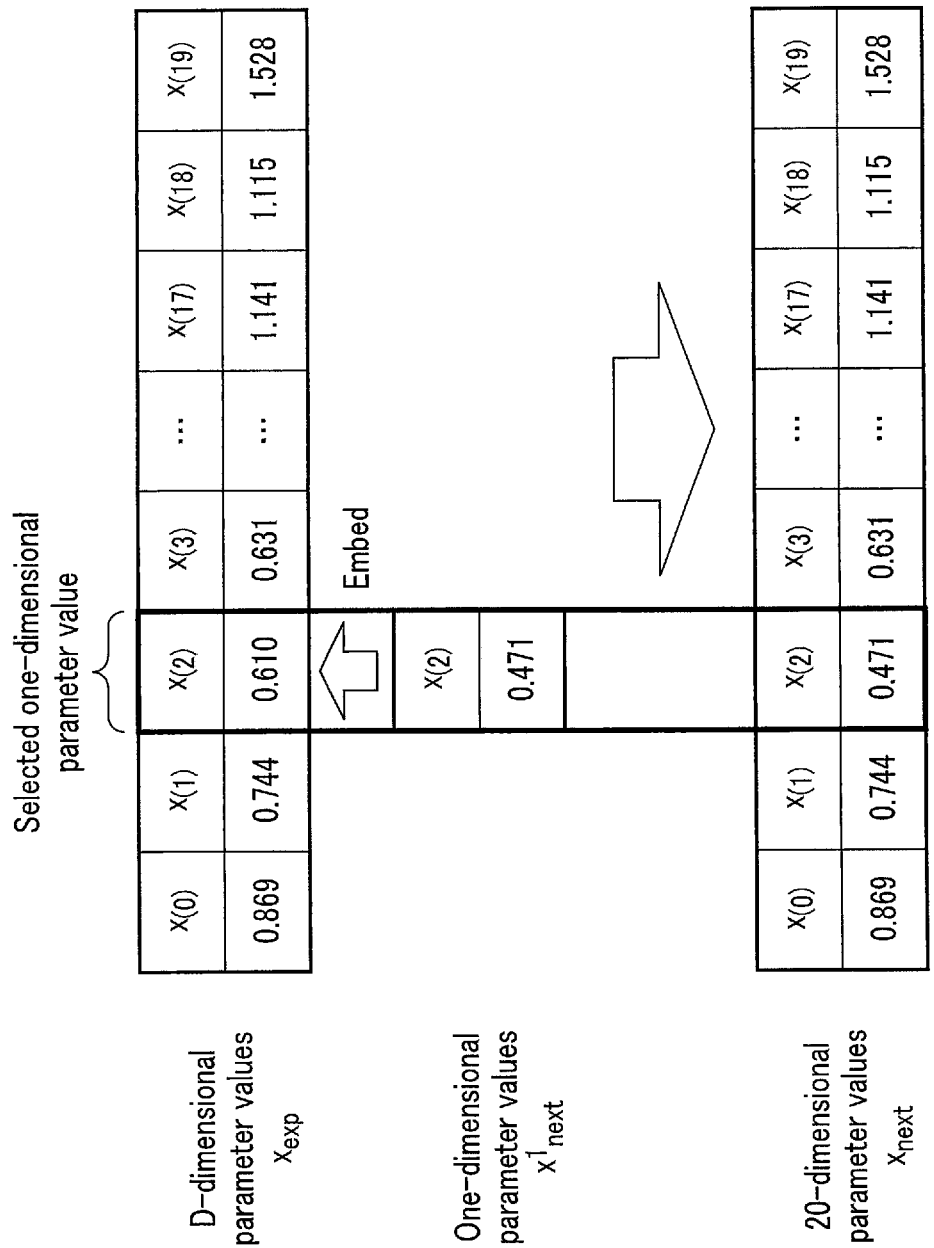
FIG. 6 is a diagram showing an example of a method of converting a one-dimensional parameter value into a 20-dimensional parameter value.

FIG. 6 is a diagram showing an example of a method of converting a one-dimensional parameter value into a 20-dimensional parameter value. That is, FIG. 6 shows an example when D=20 and r=1. FIG. 6 is an example in which the one-dimensional parameter selected by the search space determination unit 12 is a third element, that is, one-dimensional parameter value $x_{(2)}$. As shown in FIG. 6, one-dimensional parameter value $x^1_{next}$ may be embedded into one-dimensional parameter value $x_{(2)}$, which is the third element of the 20-dimensional parameter value $x_{exp}$, so as to convert one-dimensional parameter value $x^1_{next}$ into the 20-dimensional parameter value $x_{exp}$.

Thereafter, the data generation unit 15 inputs the converted D-dimensional parameter value $x_{next}$ into the observed value output apparatus 3. The observed value output apparatus 3 conducts simulations, experiments, or questionnaire surveys, and outputs an observed value $y_{next}$ based on the D-dimensional parameter value $x_{next}$. The data generation unit 15 acquires observed value $y_{next}$ from the observed value output apparatus 3, generates a data set that includes D-dimensional parameter value $x_{next}$ and observed value $y_{next}$ and causes the data storage 11 to store the data set.

The optimal parameter value acquisition unit 16 selects, from the plurality of data sets stored in the data storage 11, a D-dimensional parameter value corresponding to a minimum observed value as optimal parameter value $x_{best}$.

Figure 7:
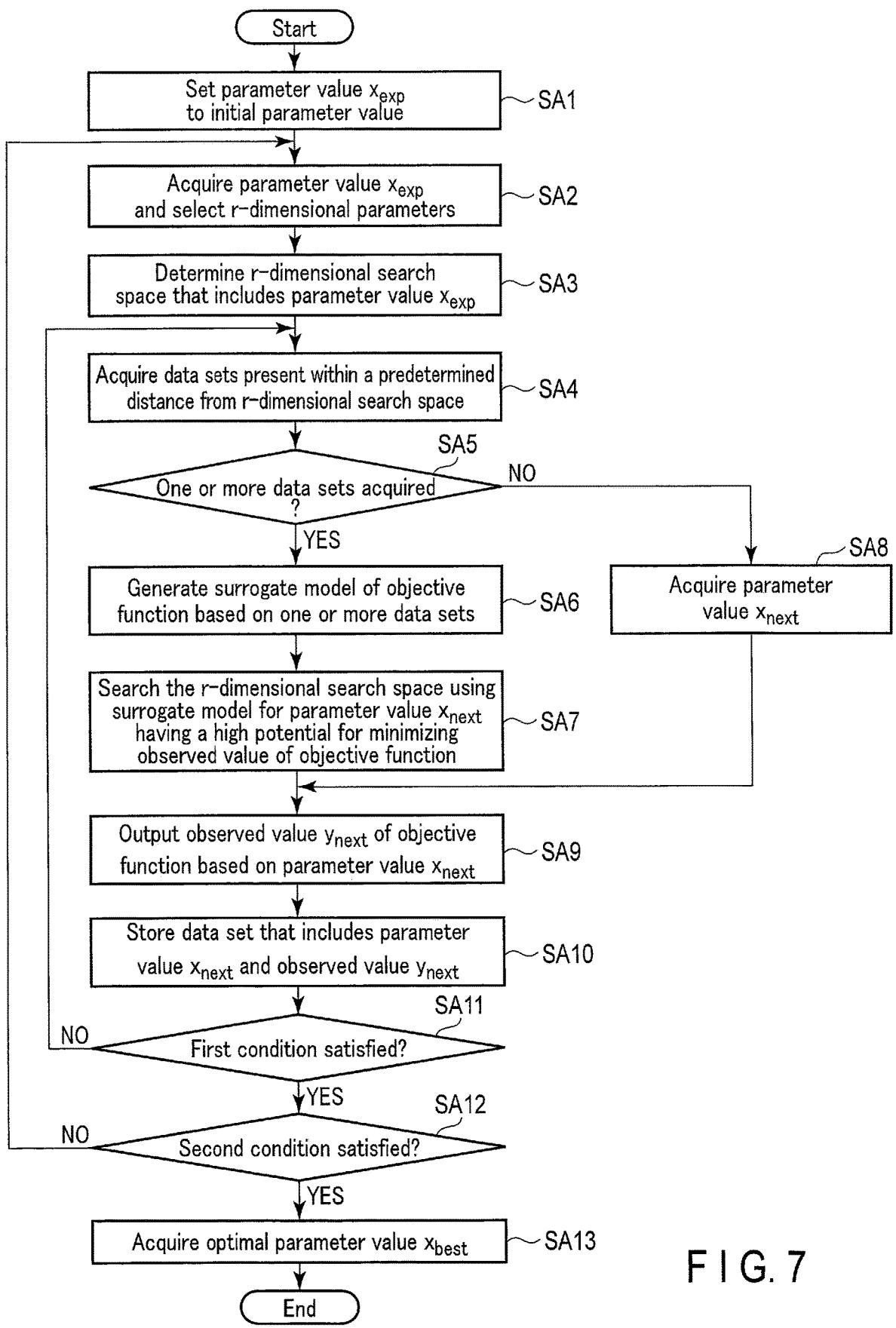
FIG. 7 is a flow chart showing an example of a process operation of the parameter optimization system according to the first embodiment.

Next, a process operation of the parameter optimization system 1 having the parameter optimization apparatus 2A according to the first embodiment will be described with reference to FIG. 7 FIG. 7 is a flowchart showing an example of a process operation of the parameter optimization system 1 according to the first embodiment.

As shown in FIG. 7, the search space determination unit 12 first sets a parameter value $x_{exp}$, which serves as a reference point in the search space, to an initial parameter value (step SA1). For the initial parameter value, a randomly selected value or a past adjustment result may be used.

When step SA1 is performed, the search space determination unit 12 selects r-dimensional parameters from the D-dimensional parameters, wherein r dimensions are lower than D dimensions (step SA2). If data sets are stored in the data storage 11, the search space determination unit 12 acquires a D-dimensional parameter value $x_{exp}$ with which an observed value of an objective function is a minimum value, and, if no data sets are stored in the data storage 11, acquires the parameter value $x_{exp}$ set in step SA1. To select r-dimensional parameters, for example, D-dimensional parameters may be divided into groups of r-dimensional parameters in advance and one group may be selected from the groups, or r-dimensional parameters may be randomly selected. Preferably, a group is selected from multiple groups, in order, every time a loop relating to a second condition (described later) is iterated a predetermined number of times. For example, $x_0$ to $x_4$ are sorted into a first group, $x_5$ to $x_9$ into a second group, $x_{10}$ to $x_{14}$ into a third group, and $x_{15}$ to $x_{19}$ into a fourth group, and the first to fourth groups are selected in order every time the loop relating to the second condition is iterated. Alternatively, without such grouping, r-dimensional values may be randomly selected from D-dimensional values.

After step SA2, the search space determination unit 12 determines an r-dimensional affine subspace that includes the D-dimensional parameter value $x_{exp}$ acquired in step SA2 and corresponds to the r-dimensional parameters selected in step SA2 as a search space (step SA3). Specifically, the search space determination unit 12 determines an r-dimensional affine subspace that passes parameter value $x_{exp}$. Herein, the r-dimensional affine subspace is denoted by A. A is expressed as $A=x_{exp}+U=\{x_{exp}+u|u \in U\}$. $x_{exp}$ is a position vector of A. U represents an r-dimensional linear subspace associated with A. Preferably, the r-dimensional linear subspace is changed every time the loop relating to the second condition is iterated.

FIG. 8 is a diagram showing an example of a one-dimensional affine subspace 61. That is, FIG. 8 shows an example when D=2 and r=1. FIG. 8 illustrates a one-dimensional affine subspace 61 set in the two-dimensional space having $x_0$ and $x_1$ as coordinate axes. A one-dimensional linear subspace 62 associated with the one-dimensional affine subspace 61 is set. The one-dimensional linear subspace 62 passes the origin of the two-dimensional coordinate space. For the one-dimensional affine subspace 61, the one-dimensional linear subspace 62 can be changed, to the extent that it passes $x_{exp}$, in accordance with the number of iterations of the loop relating to the second condition. For example, the one-dimensional affine subspace 61 is changed so as to be parallel with each of the coordinate axes of the two-dimensional space in accordance with the number of iterations of the loop relating to the second condition. In the example of FIG. 8, the one-dimensional affine subspace 61 before the change is parallel to the $x_0$ axis corresponding to the one-dimension $x_0$ selected in step SA2, but if the loop relating to the second condition is iterated, the one-dimensional affine subspace 61 may be changed so as to be parallel with the $x_1$ axis corresponding to the one-dimension $x_1$ selected in step SA2. Thus, every time the loop relating to the second condition is iterated, the one-dimensional linear subspace 62 associated with the one-dimension affine subspace 61 may be changed alternately between the $x_0$ axis and the $x_1$ axis. The search space determination unit 12 sets the changed one-dimensional affine subspace 61 as the one-dimensional search space.

When D>r≥2 and the number of dimensions of the affine subspace is 2 or greater, the r-dimension linear subspace associated with the r-dimensional affine subspace is set so as to include r of D coordinate axes defining the D-dimensional space, every time the loop regarding the second condition is iterated. Thus, if $x_{exp}$ is not a zero vector, the r-dimensional affine subspace is parallel to each of r coordinate axes.

After step SA3, the data acquisition unit 13 acquires data sets present within a predetermined distance (threshold) from the r-dimensional search space (step SA4). Specifically, the data acquisition unit 13 selects and acquires data sets having a D-dimensional parameter value that falls within a predetermined distance from the r-dimensional search space (namely, a D-dimensional parameter value in the vicinity of the search space) from a plurality of data sets included in the data storage 11. Specifically, the data acquisition unit 13 calculates a distance between a D-dimensional parameter value and the r-dimension search space for each of $N_0$ data sets and specifies a D-dimensional parameter value at a distance from the r-dimensional search space less than the predetermined distance. Data sets that each include the specified D-dimensional parameter value and the observed value corresponding thereto are acquired from the data storage 11. Herein, the data acquisition unit 13 may acquire an r-dimensional parameter value from the specified D-dimensional parameter value. In this case, the data acquisition unit 13 may convert the data set relating to the specified D-dimensional parameter value into an r-dimensional parameter value and a data set relating thereto, as shown in FIG. 6. The threshold for distance is not necessarily a constant value and may be variable. The threshold for distance may be changed for every loop regarding step SA11 or SA12 (to be described later) for example. The threshold for distance may be changed in accordance with the number of iterations of that loop. The greater the number of iterations, the smaller the threshold may be set at.

The number of data sets acquired by the data acquisition unit 13 is denoted by N. N data sets are denoted by $\{(x_n, y_n)|n=0, 1, \ldots, N-1\}$. The number of data sets stored in the data storage 11, $N_0$, increases through the iteration of the loop regarding the first condition and the loop regarding the second condition; thus, the value of the number N changes in accordance with the iteration of the loop relating to the first condition and the loop relating to the second condition.

After step SA4, the data acquisition unit 13 determines whether or not one or more data sets are acquired from the data storage 11 in step SA4 (step SA5).

If it is determined in step SA5 that one or more data sets are acquired (Yes in step SA5), the parameter search unit 14 generates a surrogate model of an objective function based on the one or more data sets (step SA6). As described above, the parameter search unit 14 models, as an example, an objective function by Gaussian process regression in step SA6. If the parameter value of the data sets acquired in step SA4 is a D-dimensional parameter value, an objective function is modelled as a function of the D-dimensional parameter value. If the parameter value of the data sets acquired in step SA4 is an r-dimensional parameter value, an objective function is modelled as a function of the r-dimensional parameter value.

After step SA6, the parameter search unit 14 searches the r-dimensional search space for a D-dimensional parameter value $x_{next}$ or an r-dimensional parameter value $x^r_{next}$ that has a high potential for minimizing the observed value of the objective function, using the surrogate model (step SA7). If the objective function is modelled as a function of a D-dimensional parameter value, D-dimensional parameter value $x_{next}$ is searched; if the objective function is modelled as a function of an r-dimensional parameter value, r-dimensional parameter value $x^r_{next}$ is searched.

Hereinafter, details of step SA6 and step SA7 are described. To generate the surrogate model of an objective function, either Gaussian process regression or another surrogate model such as the Tree-structured Parzen Estimator (TPE) or random forest regression may be used.

For Bayesian optimization, Gaussian process regression, which is a function of a D-dimensional parameter value, is preferable. In this case, the parameter search unit 14 generates, as a surrogate model of an objective function, a Gaussian process regression model based on N data sets acquired in step SA4, $\{(x_n, y_n)|n=0, 1, \ldots, N-1\}$. Next, the parameter search unit 14 calculates a mean $m(x^*)$ and standard deviation $\sigma(x^*)$ of a predicted distribution of the observed value $y^*$ of the objective function corresponding to a discretionarily selected D-dimensional parameter value $x^*$. The parameter search unit 14 calculates an acquisition function $a(x^*)$ based on the mean $m(x^*)$ and the standard deviation $\sigma(x^*)$. The parameter search unit 14 determines D-dimensional parameter value $x_{next}$ that maximizes the acquisition function $a(x^*)$, restricting the search range to the r-dimensional search space. The D-dimensional parameter value $x_{next}$ is determined as a D-dimensional parameter value that has a high potential for minimizing the observed value of the objective function.

If the parameter value acquired from the data acquisition unit 13 is r-dimensional, it is possible to calculate the mean $m_r(x^{r*})$ and the standard deviation $\sigma_r(x^{r*})$ of the predicted distribution of the observed value $y^{r*}$ of the objective function corresponding to a discretionarily selected r-dimensional parameter value $x^{r*}$. Then, an r-dimensional parameter value $x^r_{next}$ that maximizes the acquisition function $a(x^{r*})$ calculated with use of the $m_r(x^{r*})$ and the standard deviation $\sigma_r(x^{r*})$ is determined within the r-dimensional search space, and this r-dimensional parameter value $x^r_{next}$ is set as an r-dimensional parameter value that has a high potential for minimizing the observed function of the objective function. Compared to the expression in the case where the parameter value acquired from the data acquisition unit 13 is D-dimensional, the expressions differ in terms of the superscript "r". Since it suffices merely to add the superscript "r" to the expression for the case of D-dimension, the explanations for the case where the parameter value is r-dimension may be partially omitted.

For the acquisition function, either PI (probability of improvement) or EI (expected improvement) may be used, for example. Alternatively, an upper confidential bound (UCB), Thompson sampling (TS), entropy search (ES), and mutual information (MI) may be used. Furthermore, as a method of calculating D-dimensional parameter value $x_{next}$ that maximizes the acquisition function, whole search, random search, grid search, the Newton method, L-BFGS, DIRECT, CMA-ES, or multiple-start local search, etc. are known for example. A method of maximizing an acquisition function is not limited to the above-given examples, and any discretionarily chosen method may be adopted.

Hereinafter, the Gaussian process regression is explained in detail. Assume that N data sets acquired by the data acquisition unit 13 is $\{(x_n, y_n)|n=0, 1, \ldots, N-1\}$. The Gaussian process regression is modeled on the assumption that the vector of the observed value of the objective function, $\{y_n|n=0, 1, \ldots, N-1\}$, corresponding to the vector of the input parameter value, $\{x_n|n=0, 1, \ldots, N-1\}$, conforms to the Gaussian distribution Norm(m, $K+s^2I$). m is an average vector of N-dimension. An "i" component of m is calculated by the average function $m_0(x_i)$. K is N×N matrix that represents covariance between all input parameter values $x_n$. The $(x_i, x_j)$-th component of K is calculated by a kernel function $k(x_i, x_j)$. The kernel function may be, for example, a Gaussian kernel, a Matern kernel, or a linear kernel. s represents a standard deviation of a noise component when the objective function $f(\cdot)$ is observed. I represents a unit matrix of N×N. $m_0$ is often treated as a 0 vector after data is appropriately processed. Thus, hereinafter, the Gaussian process regression will be explained as a model that follows the Gaussian distribution Norm(0, $K+s^2I$).

To predict a distribution of an observed value $y^*$ of an objective function corresponding to a discretionarily selected D-dimensional parameter value $x^*$ using the Gaussian process regression model, a mean $m(x^*)$ of the distribution of the observed value $y^*$ is calculated by the following expression: $m(x^*)=k(x^*, x_{0:N-1})^T(K+s^2I)^{-1}y_{0:N-1}$, and the distribution, $\sigma^2(x^*)$, is calculated by the following expression: $\sigma^2(x^*)=k(x^*, x^*)-k(x^*, x_{0:N-1})^T(K+s^2I)^{-1}k(x^*, x_{0:N-1})$. It is known that an inverse matrix of $K+s^2I$, which is used in the calculation of the predicted distribution of the observed value $y^*$, $(K+s^2I)^{-1}$, is an inverted matrix of N×N, and the order of the calculation amount is $O(N^3)$. Similarly, the order of the calculation amount is also $O(N^3)$ in the case where the parameter value is r dimensional. On the other hand, if all $N_0$ data sets stored in the data storage 11, and not N data sets acquired by the data acquisition unit 13, are used, the calculation order of the corresponding inverse matrix is $O(N_0^3)$ As in the data acquisition unit 13 according to the present embodiment, it is possible to reduce an amount of inverse matrix calculation of $K+s^2I$, namely $(K+s^2I)^{-1}$, by reducing the number of data sets used with Gaussian process regression, through selection of N data sets used with Gaussian process regression from $N_0$ data sets stored in the data storage 11. It is thereby possible to solve a problem relating to an amount of calculation of an inverse matrix of $K+s^2I$, namely $(K+s^2I)^{-1}$. In addition, as a policy for selecting data sets, use of a data set in the vicinity of the r-dimensional search space helps prevent search efficiency degradation. In other words, according to the present embodiment, it is possible to achieve both the reduction in calculation amount and the suppression of search efficiency degradation.

In the case where TPE, not the Gaussian process regression, is used, the search space determination unit 12 sets r=1 in step SA2. In step SA6, the parameter search unit 14 divides data sets into two groups depending on whether an observed value of an objective function is smaller or equal to or greater than a predetermined threshold, and models a distribution of an r-dimensional parameter value $x^r$ for each group, using kernel density estimation. Herein, the distribution of the group in which the observed value of an objective function is smaller than the threshold is denoted by $l(x^r)$, and the distribution of the group in which the observed value of an objective function is equal to or greater than the threshold is denoted by $g(x^r)$. The distributions $l(x^r)$ and $g(x^r)$ correspond to surrogate models of an objective function.

Next, in step SA7, the parameter search unit 14 determines the r-dimensional parameter value $x^r_{next}$ that minimizes $g(x^r)/l(x^r)$ as an r-dimensional parameter value having a high potential for minimizing an observed value of an objective function. Even in the case of the TPE, since data sets to be used are restricted to those in the vicinity of the search space, a calculation amount of $g(x^r)/l(x^r)$, etc. can be thereby reduced. This leads to prevention of search efficiency degradation. Thus, according to the present embodiment, it is possible to achieve both the reduction in the calculation amount and the suppression of search efficiency degradation.

If it is determined in step SA5 that one or more data sets have not been acquired (No in step SA5), the data acquisition unit 13 acquires a D-dimensional parameter value $x_{next}$ (step SA8). In step SA8, the data acquisition unit 13 acquires the D-dimensional parameter value $x_{exp}$ set in step SA2 as the D-dimensional parameter value $x_{next}$ for calculating an observed value of an objective function, for example. The data acquisition unit 13 may randomly generate a D-dimensional parameter value $x_{next}$ within the r-dimensional search space. The data acquisition unit 13 may acquire r-dimensional parameter value $x^r_{next}$ with a method similar to the method of acquiring a D-dimensional parameter value $x_{next}$.

After step SA7 or SA8 is performed, the observed value output apparatus 3 outputs an observed value of an objective function based on the D-dimensional parameter value $x_{next}$ searched or acquired in step SA7 or SA8 (step SA9). Specifically, the data generation unit 15 first notifies the observed value output apparatus 3 of the D-dimensional parameter value $x_{next}$ searched or acquired in step SA7 or SA8. If the r-dimensional parameter value $x^r_{next}$ has been searched for or acquired in step SA7 or SA8, the data generation unit 15 converts the r-dimensional parameter value $x^r_{next}$ into a D-dimensional parameter value $x_{next}$ and then notifies the observed value output apparatus 3. The observed value output apparatus 3 conducts simulations, experiments, or questionnaire surveys using the D-dimensional parameter value $x_{next}$ and outputs an observed value of an objective function corresponding to the D-dimensional parameter value $x_{next}$.

For example, the observed value output apparatus 3 has a simulator/experiment apparatus and a conversion apparatus. The simulator/experiment apparatus and the conversion apparatus are realized by computers. The simulator/experiment apparatus conducts simulations, experiments, or questionnaire surveys using the D-dimensional parameter value $x_{next}$, or acquires results of externally conducted simulations, experiments, or questionnaire surveys, so as to output characteristic values of one or more items of the D-dimensional parameter value $x_{next}$. The conversion apparatus acquires characteristics values from the simulator/experiment apparatus and converts the acquired characteristics values into scalars. The characteristic values converted into scalars are transmitted to the data generation unit 15 as observed value $y_{next}$ of an objective function regarding the D-dimensional parameter value $x_{next}$.

The simulator/experiment apparatus and the conversion apparatus may be realized by a single computer. Either one of the simulation/experiment apparatus or the conversion apparatus may be incorporated into the parameter optimization apparatus 2A and included in, for example, the data generation unit 15.

After step SA9, the data sets that include the D-dimensional parameter value $x_{next}$ searched for or acquired in step SA7 or SA8 and the observed value output in step SA9 are stored in the data storage 11 (step SA10). Specifically, the data generation unit 15 generates a data set $(x_{next}, y_{next})$ by coupling the D-dimensional parameter value $x_{next}$ searched for or acquired in step SA7 or SA8 with the observed value output in step SA9. The data storage 11 then stores the generated data set $(x_{next}, y_{next})$.

After step SA10, the data acquisition unit 13 determines whether or not the first condition is satisfied (step SA11). The first condition defines the number of times of performing parameter search within the r-dimensional search space determined by the search space determination unit 12. Accordingly, the r-dimensional search space does not change within this iteration. The first condition is satisfied when the number of times exceeds a predetermined number of times or an elapsed time exceeds a predetermined length or time, or when an amount of improvement of the observed value of the objective function dips below a predetermined value. Alternatively, these conditions may be combined.

When it is determined that the first condition is not satisfied (No in step SA11), the data acquisition unit 13 conducts the process in step SA4 on the same r-dimensional search space. Thereafter, step SA5 to step SA11 are performed. Until it is determined in step SA11 that the first condition is satisfied, the process from step SA4 through step SA11 in the data storage 11, the data acquisition unit 13, the parameter search unit 14, and the data generation unit 15 is iterated, and search or acquisition of D-dimensional parameter value $x_{next}$ is iterated in the same r-dimensional search space, and generation and storage of a data set $(x_{next}, y_{next})$ including the D-dimensional parameter value $x_{next}$ and the observed value $y_{next}$ is also iterated. Processes from step SA4 to step SA11 may be performed either in parallel or in series by multiple tasks. In this case, the data storage 11 is provided for each task, and a plurality of data sets $(x_{next}, y_{next})$ of a corresponding task are accumulated in each data storage 11.

When it is determined in step SA11 that the first condition is satisfied (Yes in step SA11), the search space determination unit 12 determines whether or not the second condition is satisfied (step SA12). The second condition defines the number of determinations of the r-dimensional search space by the search space determination unit 12. The value of r may be either a predetermined or randomly-determined number. The second condition is satisfied when the number of times exceeds a predetermined number of times or an elapsed time exceeds a predetermined length or time, or when an amount of improvement of the observed value of the objective function dips below a predetermined value. Alternatively, these conditions may be combined.

If it is determined that the second condition is not satisfied (No in step SA12), the search space determination unit 12 selects different r-dimensional parameters from D-dimensional parameters (step SA2). The search space determination unit 12 acquires a D-dimensional parameter value $x_{exp}$ associated with an observed value of an objective function as a minimum from the data sets stored in the data storage 11. To select r-dimensional parameter, for example, if D-dimensional parameter are divided into groups of r-dimensional parameter in advance as described earlier, one group may be selected from these groups, or r-dimensional parameter may be randomly selected. Alternatively, r-dimensional parameter may be randomly selected from D-dimensional parameter values. The value of r may be randomly set within the range where r is smaller than D. Thereafter, step SA3 to step SA12 are performed. Until it is determined in step SA12 that the second condition is satisfied, the process from step SA2 through step SA12 in the data storage 11, the search space determination unit 12, the data acquisition unit 13, the parameter search unit 14, and the data generation unit 15 is iterated, and search or acquisition of a D-dimensional parameter value $x_{next}$ is iterated and generation and storage of a data set ($x_{next}$, $y_{next}$) including the D-dimensional parameter value $x_{next}$ and the observed value $y_{next}$ is also iterated, through the changing of the r-dimensional parameters, in other words, changing the r-dimensional search space. Processes from step SA2 to step SA12 may be performed either in parallel or in series by multiple tasks. In this case, the data storage 11 is provided for each task, and a plurality of data sets ($x_{next}$, $y_{next}$) of a corresponding task are accumulated in each data storage 11.

If processes from step SA4 to step SA11 are performed in parallel or in series by multiple tasks, the data generation unit 15 may acquire, after it is determined that the first condition is satisfied and before the process of step SA2 is performed, a D-dimensional parameter value that minimizes the observed value of the objective function from the plurality of data sets stored in the data storage 11 for each task. Data sets that each include the acquired D-dimensional parameter value and the observed value corresponding thereto are stored in the data storage 11 of each task.

When it is determined in step SA12 that the second condition is satisfied (Yes in step SA12), the optimal parameter value acquisition unit 16 acquires an optimal parameter value $x_{best}$ associated with a minimum observed value of the objective function from the data sets stored in the data storage 11 (step SA13). The optimal parameter value $x_{best}$ is output to an external apparatus. In the manufacturing phase, an optimal parameter value $x_{best}$ means a parameter value that maximizes manufacturing yield or a parameter value that minimizes post-shipment failure rates, for example. In the usage phase, an optimal parameter value $x_{best}$ means a parameter value that enables a device or component delivered to a user to exhibit performance suitable for a user's usage environment. An optimal parameter value $x_{best}$ is used in accordance with various purposes in an external device to which the optimal parameter value is output. An optimal parameter value $x_{best}$ is storable in a data storage 11 and displayable on a display device.

If processes from step SA2 to step SA12 is performed in parallel or in series by multiple tasks, the data generation unit 16 may acquire, after it is determined that the second condition is satisfied, an optimal parameter value $x_{best}$ that minimizes the observed value of the objective function from the plurality of data sets stored in the data storage 11 provided for each task.

Thus, the process operation of the parameter optimization system 1 according to the first embodiment is finished.

As described above, according to the first embodiment, data sets used to calculate a surrogate model are restricted to those in the vicinity of the search space; for this reason, it is possible to reduce an amount of calculation of a surrogate model compared to conventional technology. By using a data set within a relatively short distance from the search space as a data set used to calculate a surrogate model, efficiency degradation in searching for a parameter value $x_{next}$ is prevented. In other words, it is possible to achieve both reduction of a calculation amount and suppression of search efficiency degradation, and efficiency in searching for an optimal parameter value $x_{best}$, in other words, efficiency in parameter optimization, is improved.

Second Embodiment

Next, a parameter optimization system 1 and a parameter optimization apparatus 2B according to the second embodiment are described. Note that in the following description, the same reference numerals denote constituent elements having almost the same functions as those included in the first embodiment, and a repetitive description will be made only when required.

Figure 9:
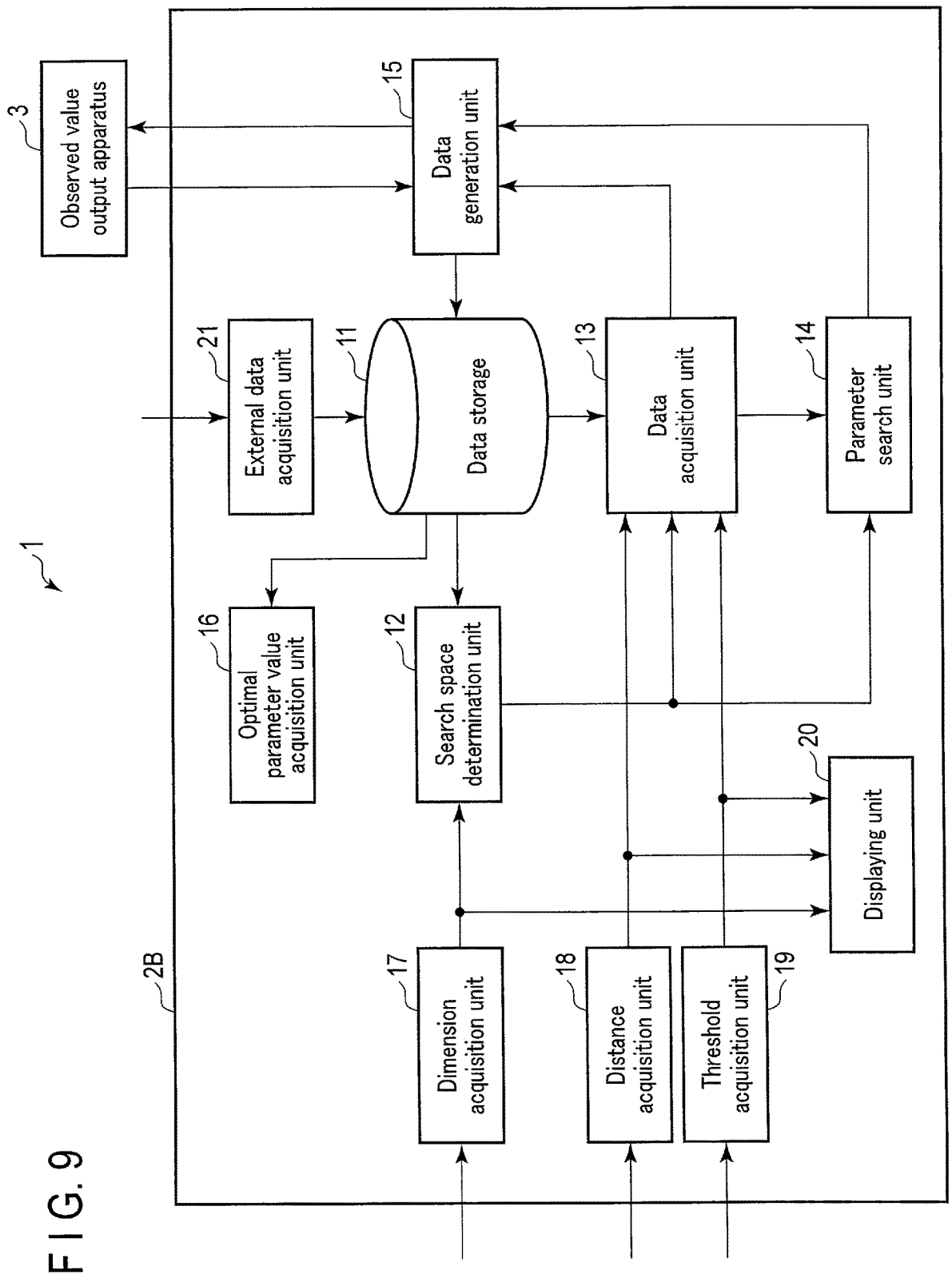
FIG. 9 is a diagram showing a functional configuration example of a parameter optimization system according to a second embodiment.

FIG. 9 is a diagram showing a functional configuration example of a parameter optimization system 1 according to the second embodiment. As shown in FIG. 9, the parameter optimization system 1 according to the second embodiment has a parameter optimization apparatus 2B and an observed value output apparatus 3.

The parameter optimization apparatus 2B has a data storage 11, a search space determination unit 12, a data acquisition unit 13, a parameter search unit 14, a data generation unit 15, an optimal parameter value acquisition unit 16, a dimension acquisition unit 17, a distance acquisition unit 18, a threshold acquisition unit 19, a displaying unit 20, and an external data acquisition unit 21.

The dimension acquisition unit 17 acquires the number of dimensions r input by a user via an input device, etc. For example, the dimension acquisition unit 17 acquires the number of dimensions, r, input into a graphical user interface (GUI) screen displayed on the displaying unit 20 for inputting the number of dimensions r (hereinafter a "dimension input screen").

The distance acquisition unit 18 acquires a type of distance input by a user via an input device, etc. For example, the distance acquisition unit 18 acquires a type of distance input into the GUT screen displayed on the displaying unit 20 for inputting a type of distance (hereinafter a "distance type input screen").

The threshold acquisition unit 19 acquires a threshold for the distance from the r-dimensional search space input by a user via an input device, etc. For example, the threshold acquisition unit 19 acquires a threshold input into the GUI screen displayed on the displaying unit 20 for inputting thresholds (hereinafter a "threshold input screen").

The displaying unit 20 causes a display device to display a dimension input screen, a distance type input screen, a threshold input screen, and etc. It suffices that the display device is realized by a display or a projector, for example.

The external data acquisition unit 21 acquires a plurality of data sets from an external apparatus of the parameter optimization apparatus 1B.

Figure 10:
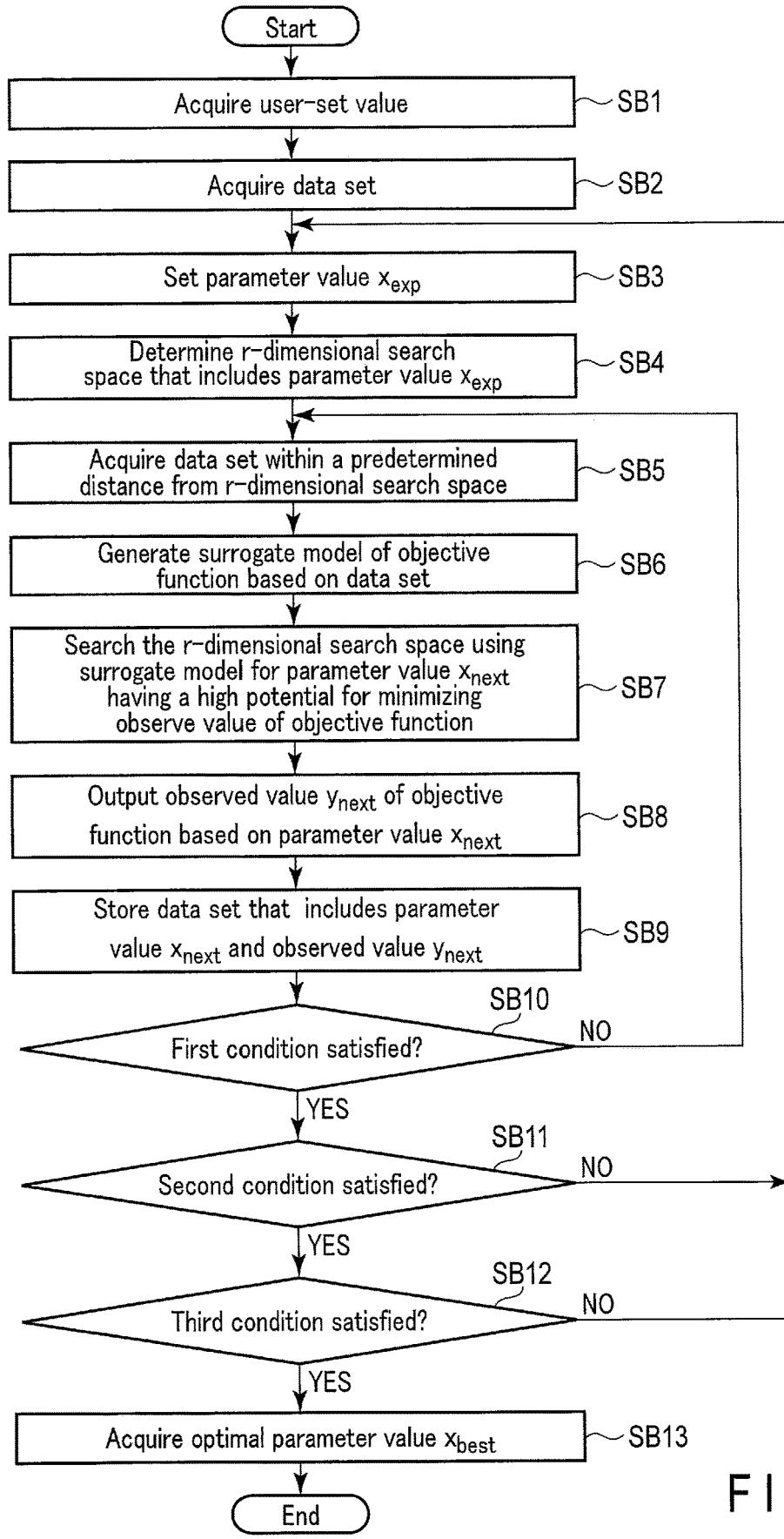
FIG. 10 is a flowchart showing an example of a process operation of the parameter optimization system according to the second embodiment.

Next, a process operation of the parameter optimization system 1 having the parameter optimization apparatus 2B according to the second embodiment will be described with reference to FIG. 10. FIG. 10 is a flowchart showing an example of a process operation of the parameter optimization system 2 according to the first embodiment.

As shown in FIG. 10, the dimension acquisition unit 17, the distance acquisition unit 18, and/or threshold acquisition unit 19 acquire(s) various setting values compliant to instructions input from a user via the input device (step SB1). Herein, the "setting values" is a general term for the number of dimensions r, a type of distance and a threshold.

In step SB1, the dimension acquisition unit 17 receives instructions from a user regarding the number of dimensions and supplies the instructions to the search space determination unit 12 and the displaying unit 20. For example, the dimension acquisition unit 17 receives an input instruction regarding the number of dimensions input by a user into the dimension acquisition screen displayed on the displaying unit 20.

FIG. 11 is a diagram showing an example of a dimension acquisition screen I1. As shown in FIG. 11, the dimension acquisition screen I1 displays a message to prompt a user to input the number of dimensions r, for example "Please input the number of dimensions r of the search space", the display section I11 for the number of dimensions r, and an up-down button I12. The display section I11 displays a value of the number of dimensions r designated by a user. The up-down button I12 is a button to increase or decrease the value of the number of dimensions r when pressed by a user via an input device. By pressing the up-down button I12, the displaying unit 20 increases and decreases the value of the number of dimensions r displayed on the display section I11 by a predetermined unit of value. The value displayed on the displaying unit 20 is received by the dimension acquisition unit 17 as an input instruction regarding the number of dimensions.

The dimension acquisition screen I1 shown in FIG. 11 is merely an example and various modifications can be made. For example, a text box for directly inputting a value of the number of dimensions r by a user via an input device may be displayed on the dimension acquisition screen I1. Upon input of a value indicating the number of dimensions into a text box by a user, an instruction regarding the number of dimensions to be received by the dimension acquisition unit 17 is output. The value of r assumed in the present embodiment is an integer equal to or greater than 1 and less than D; thus, the dimension acquisition unit 17 may impose restrictions on input values so that values smaller than 1, or equal to or greater than D, or decimal fractions cannot be input. When a value smaller than 1, or equal to or greater than D, or a decimal fraction is input, the dimension acquisition unit 17 may cause the displaying unit 20 to display an error.

An input instruction regarding the number of dimensions by a user is not mandatory. When there is no input instruction regarding the number of dimensions by a user, the dimension acquisition unit 17 supplies a default value of the number of dimensions to the search space determination unit 12 and the displaying unit 20. It suffices that the default value is set to "1", for example. Preferably, the default value is also displayed in the text box.

In step SB1, the distance acquisition unit 18 receives an instruction regarding a type of distance from a user, and supplies the instructions to the search space determination unit 12 and the displaying unit 20. For example, the dimension acquisition unit 18 receives an input instruction regarding a type of distance input by a user into the distance type input screen displayed on the displaying unit 20.

FIG. 12 is a diagram showing an example of the distance type input screen I2. As shown in FIG. 12, the distance type input screen I2 displays a message to prompt a user to input a type of distance, for example "Please select a type of distance", a candidate display column I21 for a type of distance, and an up-down button I22. The candidate display column I21 may be caused to display, for example, the Euclidean distance, the Mahalanobis' distance, the cosine distance, and the Mahalanobis' distance, etc. The select button I22 is provided in correspondence to each of the plurality of candidates displayed in the candidate display column I21. When the select button I22 is pressed by the user via an input device such as a mouse, etc., a corresponding type of distance is received by the distance acquisition unit 18 as an input instruction of a type of distance.

The distance type input screen I2 shown in FIG. 12 is merely an example and various modifications can be made. For example, a text box for directly inputting a value of a type of distance by a user via an input device may be displayed on the distance type acquisition screen I2. Upon input of a value indicating the number of dimensions into a text box by a user, an instruction regarding a type of distance to be received by the distance type acquisition unit 18 is output.

An input instruction regarding the number of dimensions from a user is not mandatory. When there is no input instruction regarding a type of distance from a user, the dimension acquisition unit 18 supplies a default value of a type of distance to the search space determination unit 13 and the displaying unit 20. The default value may be set to, for example, the Euclidean distance. The default value may be, however, set to the Manhattan distance, the cosine distance, or the Mahalanobis' distance. If the unit, scale, and defined range are different between D types of parameters, the Mahalanobis' distance is effective in some cases. As for the distance scale of a kernel function used in the Gaussian process regression, the Manhattan distance, the cosine distance, or the Mahalanobis' distance may be adopted instead of the Euclidean distance.

In step SB1, the threshold acquisition unit 19 receives instructions from a user regarding the threshold and supplies the instructions to the search space determination unit 13 and the displaying unit 20. The threshold acquired by the threshold acquisition unit 19 is a threshold for the distance from the search space. For example, the threshold acquisition unit 19 receives an input instruction regarding a threshold input by a user into the threshold input screen displayed on the displaying unit 20.

FIG. 13 is a diagram showing an example of the threshold input screen I3. As shown in FIG. 13, the threshold input screen I3 displays a message to prompt a user to input a threshold, for example "Please input a threshold for the distance from the search space", the display section I31 for the threshold, and an up-down button I32. The display section I31 displays a value of the threshold d designated by a user. The up-down button I32 is a button to increase or decrease the value of the threshold d when pressed by a user via an input device. By pressing the up-down button I32, the displaying unit 20 increases and decreases the value of the threshold d displayed on the display section I31 by a predetermined unit of value. The value displayed on the displaying unit 20 is received by the dimension acquisition unit 17 as an input instruction regarding the threshold d.

The threshold input screen 13 shown in FIG. 13 is merely an example and various modifications can be made. For example, a text box for directly inputting a value of a threshold d by a user via an input device may be displayed on the threshold input screen II3. Upon input of a value indicating the threshold d into a text box by a user, an instruction regarding the threshold d to be received by the threshold acquisition unit 19 is output. The threshold d assumed in the present embodiment is a decimal fraction equal to or greater than 0.0; for this reason, the threshold acquisition unit 19 may impose restrictions on input values so that negative values cannot be input. When a negative value is input, the threshold acquisition unit 19 may cause the displaying unit 20 to display an error.

An input instruction regarding the threshold by a user is not mandatory. When there is no input instruction regarding the threshold by a user, the threshold acquisition unit 19 supplies a default value of the threshold to the search space determination unit 12 and the displaying unit 20. It suffices that the default value is set to "0.0" or any discretionarily chosen positive value for example. Preferably, the default value is also displayed in the text box. If there is no input instruction regarding the threshold from a user, the threshold does not necessarily remain at a default value and may be changed automatically. The threshold may be changed for every loop regarding step SB10, SB11, or SB12 which will be described later, for example. The threshold for distance may be changed in accordance with the number of iterations of that loop. The greater the number of iterations, the smaller the threshold may be set.

After step SB1, the external data acquisition unit 21 acquires $N_0$ data sets, $\{(x_n, y_n)|n=0, 1, \ldots, N_0-1\}$, from the external apparatus, such as the observed value output apparatus 3 (step SB2). Results of past simulations, experiments, and questionnaire surveys, etc. are thereby acquired. $N_0$ acquired data sets are stored in the data storage 11.

After step SB2 is performed, the search space determination unit 12 sets parameter value $x_{exp}$ (step SB3). The parameter $x_{exp}$ is set to a D-dimensional parameter value corresponding to a minimum observed value of $N_0$ data sets stored in the data storage 11.

When step SB3 is performed, the search space determination unit 12 selects r-dimensional parameters from the D-dimensional parameter, wherein r-dimensions is lower than D-dimensions (step SB4). Step SB4 is approximately the same as step SA3. As for the number of dimensions r, one acquired by the dimension acquisition unit 17 in step SB1 is used.

After step SB4, the data acquisition unit 13 acquires data sets present within a predetermined distance from the r-dimensional search space (step SB5). Step SB5 is approximately the same as step SA4. As for a type of distance, a type acquired by the distance acquisition unit 18 in step SB1 is used. As for a threshold, a threshold acquired by the threshold acquisition unit 19 in step SB1 is used. N acquired data sets are denoted by $\{(x_n, y_n)|n=0, 1, \ldots, N-1\}$. As the loop relating to the first condition is iterated, the value of N changes.

After step SB5, the parameter search unit 14 generates a surrogate model of an objective function based on the one or more data sets (step SB6). Step SB6 is approximately the same as step SA6.

After step SB6, the parameter search unit 14 searches the r-dimensional search space using a surrogate model and determines a parameter value $x_{next}$ that has a high potential for minimizing the observed value of the objective function (step SB7). Step SB7 is approximately the same as step SA7.

After step SA7 is performed, the observed value output apparatus 3 outputs an observed value $y_{next}$ of an objective function based on D-dimensional parameter value $x_{next}$ determined in step SB7 (step SB8). Step SB8 is approximately the same as step SA9.

After step SB8, the data set $(x_{next}, y_{next})$ that includes the D-dimensional parameter value $x_{next}$ determined in step SB7 and the observed value $y_{next}$ output in step SB8 are stored in the data storage 11 (step SB9). Step SB9 is approximately the same as step SA10.

After step SB9, the data acquisition unit 13 determines whether or not the first condition is satisfied (step SB10). The first condition according to the second embodiment is defined as the point at which the number of iterations of a loop relating to the first condition reaches a predetermined number of times.

If it is determined that the first condition is not satisfied (No in step SB10), the process in step SB5 to SB10 is performed. Until it is determined in step SB10 that the first condition is satisfied, the process from step SB5 through step SB10 in the data storage 11, the data acquisition unit 13, the parameter search unit 14, and the data generation unit 15 is iterated, and search or acquisition of a D-dimensional parameter value $x_{next}$ is iterated in the same r-dimensional search space, and generation of a data set $(x_{next}, y_{next})$ including the D-dimensional parameter value $x_{next}$ and the observed value $y_{next}$ is also iterated.

When it is determined in step SB10 that the first condition is satisfied (Yes in step SB10), the search space determination unit 12 determines whether or not the second condition is satisfied (step SB11). The second condition according to the second embodiment is defined as when the number of iterations of a loop relating to the second condition reaches a predetermined number of times.

If it is determined that the second condition is not satisfied (No in step SB11), the process in step SB3 to SB11 is performed. Until it is determined in step SB11 that the second condition is satisfied, the process from step SB3 to step SB11 in the data storage 11, the search space determination unit 12, the data acquisition unit 13, the parameter search unit 14, and the data generation unit 15 is iterated. Thus; while D-dimensional parameter value $x_{exp}$ that defines the search space and the r-dimensional search space including that parameter value are being changed, the search and acquisition of the D-dimensional parameter value $x_{next}$ and the generation of a data set $(x_{next}, y_{next})$ including the D-dimensional parameter value $x_{next}$ and the observed value $y_{next}$ are iterated.

If it is determined in step SB11 that the second condition is satisfied (Yes in step SB11), the search space determination unit 12 determines whether or not a third condition is satisfied (step SB12). The third condition is defined as, for example, a condition for the number of iterations of the process from step SB3 to step SB12. Specifically, the third condition is defined as when the number of iterations reaches a predetermined number of times. The predetermined number of times is set to an integer equal to or greater than 1.

If it is determined that the third condition is not satisfied (No in step SB12), the process from step SB3 to step SB12 is performed. Until it is determined in step SB12 that the third condition is satisfied, the process from step SB3 to step SB12 in the data storage 11, the search space determination unit 12, the data acquisition unit 13, the parameter search unit 14, and the data generation unit 15 is iterated. Thus, while D-dimensional parameter value $x_{exp}$ that defines the search space and the r-dimensional search space including that parameter value are being changed, the search and acquisition of the D-d-dimensional parameter value $x_{next}$ and the generation of a data set ($x_{next}$, $y_{next}$) including the D-dimensional parameter value $x_{next}$ and the observed value $y_{next}$ are iterated.

When it is determined in step SB12 that the third condition is satisfied (Yes in step SB12), the optimal parameter value acquisition unit 16 acquires an optimal parameter value $x_{best}$ associated with a minimum observed value of the objective function from the data sets stored in the data storage 11 (step SB13). The optimal parameter value $x_{best}$ is output to an external apparatus.

Thus, the process operation of the parameter optimization system 2 according to the first embodiment is finished.

As described above, according to the second embodiment, similarly to the first embodiment, data sets used to calculate a surrogate model are restricted to those in the vicinity of the search space; for this reason, it is possible to reduce a calculation amount of a surrogate model compared to conventional technology. By using a data set within a relatively short distance from the search space as a data set used to calculate a surrogate model, efficiency degradation in searching for a parameter value $x_{next}$ is prevented. In other words, it is possible to achieve both reduction of a calculation amount and suppression of search efficiency degradation, while efficiency in searching for an optimal parameter value $x_{best}$, in other words, efficiency in parameter optimization, is improved.

Further according to the second embodiment, the setting items, such as the number of dimensions, a type of distance, and a threshold, etc., can be set in accordance with a user's instruction with a use of a GUI, etc. Thus, it is possible to make use of a user's knowledge and experience for efficient parameter optimization.

(Modifications)

Next, some modifications according to the first and/or second embodiment will be described. Note that in the following description, the same reference numerals denote constituent elements having almost the same functions as those included in this embodiment, and a repetitive description will be made only when required.

(Modification 1)

In the foregoing embodiments, the data acquisition unit 13 acquires a data set in the vicinity of the search space from a data base stored in the data storage 11. In Modification 1, on the other hand, the data acquisition unit 13 randomly generates a D-dimensional parameter value in the vicinity of the search space. The generated D-dimensional parameter value is supplied to the data generation unit 15. The number of randomly generated D-dimensional parameter values is denoted by R. Herein, R is an integer equal to or greater than 1. R randomly generated D-dimensional parameter values are expressed as $\{x_{rand,i}|i=0, 1, \ldots R-1\}$.

The data generation unit 15 transmits a D-dimensional parameter value $\{x_{rand,i}|i=0, 1, \ldots, R-1\}$ to the observed value output apparatus 3.

Subsequently, the simulator/experiment apparatus, which is an example of a component of the observed value output apparatus 3, performs simulations, experiments, or questionnaire surveys on each of R D-dimensional parameter values $\{x_{rand,i}|i=0, 1, \ldots, R-1\}$, and outputs characteristics values for one or more items with respect to each of $\{x_{rand,i}|i=0, 1, \ldots, R-1\}$. The conversion apparatus, which is an example of a component of the observed value output apparatus 3, acquires one or more characteristics values and converts them into scalars. The characteristic values converted into scalars are output as an observed value of an objective function, $\{y_{rand,i}|i=0, 1, \ldots, R-1\}$, corresponding to the D-dimensional parameter value $\{x_{rand,i}|i=0, 1, \ldots, R-1\}$. The observed value $\{y_{rand,i}|i=0, 1, \ldots, R-1\}$ is transmitted to the data generation unit 15.

The data generation unit 15 supplies the data sets $\{(x_{rand,i}, y_{rand,i})|i=0, 1, \ldots, R-1\}$ to the data storage 11, and the data sets are stored in the data storage 11.

Finally, the data acquisition unit 13 acquires data sets each having a D-dimensional parameter value within a distance of a threshold from the search space as elements from the data stored in the data storage 11.

N data sets thereby acquired, $\{(x_n, y_n)|n=0, 1, \ldots, N-1\}$, thus include $\{(x_{rand,i}, y_{rand,i})|i=0, 1, \ldots, R-1\}$. In other words, in addition to the acquisition of a data set having, as an element, a D-dimensional parameter value located within a distance of a threshold from the search space, the data acquisition unit 13 may randomly generate, from the data stored in the data storage 11, D-dimensional parameter values located within a distance of a threshold from the search space and acquire data sets each including one of those D-dimensional parameter values and an observed value of an objective function corresponding thereto.

Thus, it is possible to easily add D-dimensional parameter values located within a distance of a threshold from the search space, without performing Gaussian process regression. Since Gaussian process regression is unnecessary, an inverse matrix calculation is also unnecessary.

(Modification 2)

In the second embodiment, the timing when the dimension acquisition unit 17, the distance acquisition unit 18, and the threshold acquisition unit 19 operate may differ from step SB1.

The number of dimensions r acquired by the dimension acquisition unit 17 is used in the search space determination unit 12. In other words, it suffices that the dimension acquisition unit 17 operates before the search space determination unit 12 operates.

A type of distance acquired by the distance acquisition unit 18 is used in the data acquisition unit 13. In other words, it suffices that the distance acquisition unit 18 operates before the data acquisition unit 13 operates.

The threshold acquired by the threshold acquisition unit 19 is used in the data acquisition unit 13. In other words, it suffices that the threshold acquisition unit 19 operates before the data acquisition unit 13 operates.

Every iteration of the loops relating to the first, second, and third conditions, the dimension acquisition unit 17, the distance acquisition unit 18, and the threshold acquisition unit 19 may respectively operate at a timing when the number of dimensions, a type of distance, and a threshold are changeable.

Thus, it is possible to receive instructions from a user at various timings and to change the number of dimensions, a type of distance, and a threshold at various timings.

(Modification 3)

FIGS. 3, 4, 5, 6, and 8 referred to in the descriptions of the first and second embodiments illustrate an example where the r-dimensional affine space set in the search space is controlled so that it is parallel to different coordinate axes of a D-dimensional space in accordance with the number of iterations of the loop relating to the second condition and/or third condition, in a one-dimensional affine subspace passing $x_{exp}$. In this example, r is limited to 1, and the r-dimensional linear subspace associated with the r-dimensional affine subspace includes one of the coordinate axes. However, the method of controlling the r-dimensional affine subspace set as a search space is not limited to this example.

The r-dimensional affine subspace, which serves as a search space, is determined by the number of dimensions r and the r-dimensional linear subspace accompanied by the r-dimensional affine subspace. Thus, the r-dimensional affine subspace set as a search space can be controlled through the control of r and the r-dimensional linear subspace. In the present modification, r is not limited to 1, and may be changed as long as it is an integer equal to or greater than 1 in a loop relating to the second condition or the third condition. In the loop relating to the second condition or the third condition, r may be changed by a rule in accordance with predetermined order or the number of iterations or changed randomly. Furthermore, the r-dimensional linear subspace associated with the r-dimensional affine subspace is not limited to that which includes one of the coordinate axes, and may be changed in the loop relating to the second condition or the third condition. This r-dimensional linear subspace may be changed in accordance with a rule according to a predetermined order or the number of iterations, or changed randomly in the loop relating to the second condition or the third condition.

For example, if r is set to 1 at a certain point of time, the r(=1)-dimensional affine subspace can be controlled in a linear manner; if r is set to 2 on the other hand, the r(=2)-dimensional affine subspace can be controlled in a plane. When r is 1, if the r(=1)-dimensional linear subspace associated with the r(=1)-dimensional affine subspace is set so as not to include any of the coordinated axes, the r(=1)-dimensional affine subspace passes $x_{exp}$ and can be controlled to a line not parallel to any of the coordinate axes. When r is 1, if the r(=1)-dimensional linear subspace associated with the r(=1)-dimensional affine subspace is set so as to include a certain coordinated axis, the r(=1)-dimensional affine subspace passes $x_{exp}$ and can be controlled to a line parallel to that coordinate axis. When r is 2, if the r(=2)-dimensional linear subspace associated with the r(=2)-dimensional affine subspace is set so as not to include any of the coordinated axes, the r(=2)-dimensional affine subspace passes $x_{exp}$ and can be controlled to a plane not parallel to any of the coordinate axes. When r is 2, if the r(=2)-dimensional linear subspace associated with the r(=2)-dimensional affine subspace is set so as not to include only one coordinate axis, the r(=2)-dimensional affine subspace passes $x_{exp}$ and can be controlled to a plane parallel to that coordinate axis. When r is 2, if the r(=2)-dimensional linear subspace associated with the r(=2)-dimensional affine subspace is set so as to include two coordinated axes, the r(=2)-dimensional affine subspace passes $x_{exp}$ and can be controlled to a plane parallel to those coordinate axes.

When the r-dimensional linear subspace associated with the r-dimensional affine subspace does not include r coordinate axes, the search space determination unit 12 determines, in step SA3 or step SB4, the r-dimensional affine subspace in the above-described manner, not by selecting r-dimensional parameters wherein r is smaller than D. If the r-dimensional affine subspace serving as a search space is determined, the data acquisition unit 13 calculates, in the following step SA4 or step SB5, a length of projection of a D-dimensional parameter value on the r-dimension affine subspace as a distance between a D-dimensional parameter value and the r-dimension affine subspace.

(Modification 4)

A D-dimensional parameter value may be normalized or denormalized by the parameter optimization apparatus 2A or 2B.

D types of parameters to be adjusted often vary in their units, scales, and definition ranges. Thus, a parameter value may be normalized by the parameter optimization apparatuses 2A and 2B so that the definition range falls between 0 and 1 for example, or the normalized parameters may be denormalized in order to restore the original definition range. Preferably, normalization is performed by a normalization unit, and denormalization is performed by a denormalization unit. It suffices that a normalization unit if normalization is performed, or a denormalization unit if denormalization is performed, is provided in the parameter optimization apparatuses 2A and 2B. It is thereby possible to treat D types of parameters having different units, scales, and definition ranges more easily at the same time.

The normalization and/or denormalization may be performed externally, for example the observed value output apparatus 3 or other apparatus etc. provided outside of the parameter optimization apparatuses 2A and 2B.

(Modification 5)

The second condition according to the first embodiment and the third condition according to the second condition may be changed to a condition whereby whether or not an absolute value (an amount of improvement of a difference between an observed value of an objective function corresponding to an optimal parameter value acquired by the optimal parameter value acquisition unit 16 through current iteration processing and that obtained through immediately previous iteration processing) exceeds a predetermined threshold. It suffices that an observed value stored in the data storage 11 is acquired as an observed value of an objective function corresponding to an optimal parameter value.

It is thereby possible to finish the processing at a timing when an amount of improvement of an optimal parameter value achieved by iteration processing becomes small. For this reason, the search for an optimal parameter value can be efficiently conducted.

(Modification 6)

In the foregoing embodiments, an r-dimensional affine subspace is set as a search space in order to optimize a D-dimensional parameter value. A discretionarily selected D-dimensional parameter value belonging to the r-dimensional affine subspace can be expressed as an r-dimensional vector, and this r-dimensional vector can be inversed into the original D-dimensional parameter value without being degraded. If the threshold for distance is 0, a D-dimensional parameter value acquired by the data acquisition unit 13 belongs to an r-dimensional affine subspace. Accordingly, if the threshold is 0, the parameter search unit 15 according to Modification 6 performs the following process as steps SA6 and SA7 and steps SB6 and SB7.

The parameter search unit 15 according to Modification 6 converts a D-dimensional parameter value belonging to the r-dimensional affine subspace, $x_n$ (n=0, 1, ..., N-1), into an r-dimensional parameter value $x^r_n$ (n=0, 1, ..., N-1). A Gaussian process regression model is generated based on N data sets $\{(x^r_n, y_n)|n=0, 1, \ldots, N-1\}$. Next, with the Gaussian process regression model, an average $m_r(x^r)$ and a standard deviation $\sigma_r(x^r)$ of a value $h(x^r)$ of an objective function of a discretionarily selected r-dimensional parameter value $x^r$. Herein, the objective function $h(\cdot)$ is a function that satisfies $h(x^r)=f(x)$ regarding the r-dimensional parameter value $x^r$, which is obtained by converting all D-dimensional parameter values belonging to the r-dimensional affine subspace into r-dimensional vectors. With $m_r(x^r)$ and $\sigma_r(x^r)$, $x^r$ brings the acquisition function $a_r(x^r)$ regarding the r-dimensional parameter value $x^r$ to a maximum. An acquisition function and a method of maximizing an acquisition function are not limited to the above-given examples, and any discretionarily chosen function and method may be adopted. If the calculated $x^r$ is converted into a D-dimensional parameter value, it is $x_{next}$. This $x_{next}$ belongs to an r-dimensional affine subspace, namely a search space. This $x_{next}$ is supplied to the data generation unit 15.

Thus, the dimensions of the parameters treated with the Gaussian process regression are reduced to r from D. The dimensions of the parameters of a kernel function used in the Gaussian process regression and the dimensions of the parameters treated with the acquisition function also reduce to r from D. This enables a reduction in the an amount of calculation. If the threshold of distance is a positive value, a D-dimensional parameter value acquired by the data acquisition unit 13 is, although not present within the r-dimensional affine subspace, located within a distance of the threshold and therefore in proximity to the r-dimensional affine subspace. For this reason, a D-dimensional parameter value acquired by the data acquisition unit 13 may be projected onto the r-dimensional affine subspace and processed similar to the case where the threshold is 0. Although there is deterioration in inversion, deteriorated errors are not so significant; accordingly, advantageous effects similar to those in the case where the threshold is zero can be had.

(Modification 7)

In the first and second embodiments, the parameter optimization apparatuses 2A and 2B and the observed value output apparatus 3 are separate computers. The observed value output apparatus 3 according to Modification 7 is incorporated into the parameter optimization apparatuses 2A and 2B. It thereby becomes possible to automatically optimize parameters by a single apparatus.

(Modification 8)

The first and second embodiments and Modification 1 through Modification 7 are combinable as appropriate.

(Hardware Configuration)

FIG. 14 is a diagram showing a hardware configuration example of the parameter optimization apparatuses 2A and 2B. As shown in FIG. 14, the parameter optimization apparatuses 2A and 2B includes the processing circuitry 91, the main memory apparatus 92, the auxiliary memory apparatus 93, a display device 94, an input device 95, and a communication device 96. The processing circuitry 91, the main memory apparatus 92, the auxiliary memory apparatus 93, the display device 94, the input device 95, and the communication device 96 are coupled to each other via buses.

The processing circuitry 91 executes a parameter optimization program read from the auxiliary memory apparatus 93 and developed onto the main memory apparatus 92, and functions as the search space determination unit 12, the data acquisition unit 13, the parameter search unit 14, the data generation unit 15, the optimal parameter value acquisition unit 16, the dimension acquisition unit 17, the distance acquisition unit 18, the threshold acquisition unit 19, and the external data acquisition unit 21. The main memory apparatus 92 is a memory such as a random access memory (RAM). The auxiliary memory unit 13 is a hard disk drive (HDD), a solid state drive (SSD), or a memory card, for example. The main memory apparatus 92 and the auxiliary memory apparatus 93 function as a data storage 11.

The display device 94 displays various types of display information. The display device 14 is a display or a projector, for example. The display device 94 functions as a displaying unit 20.

The input device 95 is an interface for operating the computer. The input device 95 is for example a keyboard or a mouse. The display device 94 and the input device 95 may be configured as a touch panel. The communication device 96 is an interface for communicating with other apparatus such as the observed value output apparatus 3.

The program executed by a computer is recorded in a computer readable storage medium, such as a CD-ROM, a memory card, a CD-R, or a DVD (digital versatile disc) in an installable or executable file format, and is provided as a computer program product.

A program executed by a computer may be stored in a computer coupled to a network such as the Internet, and may be configured to be provided through downloading via a network. A program executed by a computer may be configured to be provided via a network such as the Internet, without a necessity of downloading.

A program executed by a computer may be installed onto a ROM in advance to provide. A program executed by a computer has a module structure including functional blocks executable by a program, consisting of functional structures (functional blocks) of the parameter optimization apparatuses 2A and 2B. The processing circuitry 91, as actual hardware, reads a program from the storage medium and executes it; as a result, each of the functional blocks is loaded onto the main memory apparatus 92. In other words, each of the above functional blocks is generated on the main memory apparatus 92.

One or some of the functional blocks may be realized by hardware such as an integrated circuit (IC), not by software. When each function is realized by using multiple processors, each processor may realize either one, two or more of the functions.

The operation forms of a computer that realizes the parameter optimization apparatuses 2A and 2B can be discretionarily determined. For example, the parameter optimization apparatuses 2A and 2B may be realized by a single computer. For example, the parameter optimization apparatuses 2A and 2B may be operated as a cloud system on a network.

(Additional Notes)

As described above, the parameter optimization apparatuses 2A and 2B includes a data storage 11, a search space determination unit 12, a data acquisition unit 13, and a parameter search unit 14. The data storage 11 stores a plurality of data sets which each include a D-dimensional parameter value of a first number of dimensions and an observed value y of an objective function corresponding to the first parameter value. The search space determination unit 12 determines a search space, which includes a predetermined D-dimensional parameter value, of r dimensions which is smaller than D dimensions. The data acquisition unit 13 acquires, from the r-dimensional search space, one or more data sets each having a D-dimensional parameter value included in a predetermined distance d, or a data set having an r-dimensional parameter value corresponding to this data set, based on the plurality of data sets. The parameter search unit 14 searches for a D-dimensional parameter value or an r-dimensional parameter value that may optimize the objective function within the search space, using a surrogate model of the objective function based on the acquired one or more data sets.

In the first embodiment, a predetermined D-dimensional parameter value is, in a first cycle, a default value or a random value set in step SA1, and is a D-dimensional parameter value corresponding to a minimum observed value in the plurality of data sets stored in the data storage 11, which is selected in step SA2, in a second cycle and thereafter. In the second embodiment, a predetermined D-dimensional parameter value is a D-dimensional parameter value corresponding to a minimum observed value in the plurality of data sets stored in the data storage 11, which is set in step SB3.

According to the above configuration, in the search for a D-dimensional parameter value that may optimize an objective function, it is possible to reduce an amount of calculation required for the search compared to the case where the configuration not including the data acquisition unit 13, by using data sets each having a D-dimensional parameter value within a distance d from the r-dimensional search space, or data sets each having an r-dimensional parameter value corresponding to the data sets, without using all the data sets stored in the data storage 11. By using data sets in the vicinity of the r-dimension search space as described above, it is possible to suppress search efficiency degradation due to the reduced number of data sets. In other words, according to the present embodiment, it is possible to achieve both the reduction of the calculation amount and the suppression of search efficiency degradation.

Thus, according to the present embodiment, it is possible to search for optimal parameters efficiently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A parameter optimization apparatus comprising:
a memory configured to store a plurality of data sets which each include a first parameter value of a first number of dimensions and an observed value of an objective function corresponding to the first parameter value: and
processing circuitry configured to
determine a search space of a second number of dimensions that includes a predetermined first parameter value, the second number being smaller than the first number,
to acquire, based on the plurality of data sets, one or more data sets each having a first parameter value included in a predetermined distance from the search space, or one or more data sets each having a second parameter value of the second number of dimensions corresponding to this data sets, and
search the search space for a first parameter value or a second parameter value that optimizes the objective function, using a surrogate model of the objective function based on the acquired one or more data sets.

2. The parameter optimization apparatus according to claim 1, wherein
the processing circuitry is configured to generate a data set that includes an observed value of the objective function corresponding to the searched first parameter value or an observed value of the objective function corresponding to a first parameter value corresponding to the searched second parameter value, and the searched First or second parameter value, and
the memory is configured to store the generated data set.

3. The parameter optimization apparatus according to claim 2, wherein
the processing circuitry is configured to determine, after the data set is generated, whether or not a first condition is satisfied, and
if it is determined that the first condition is not satisfied, processing by the storage memory and the processing circuitry is iterated.

4. The parameter optimization apparatus according to claim 3, wherein
in an iterated process in the processing circuitry, the processing circuitry is configured to acquire, if a second condition is satisfied, a first parameter value with which an observed value of an objective function becomes a minimum or a maximum from a plurality of data sets stored in the memory, select a different second parameter of the second number of dimensions, and determine a search space of the second number of dimensions for searching for the selected second parameter in such a mariner that the search space includes the acquired first parameter value.

5. The parameter optimization apparatus according to claim 4, wherein
the processing circuitry is configured to select, in every iterated process, a second parameter belonging to a single group from second parameter values of the second number of dimensions divided into multiple groups, or randomly select a second parameter of the second number of dimensions from first parameter of the first number of dimensions.

6. The parameter optimization apparatus according to claim 4, wherein
the processing circuitry is configured to:
set an affine subspace of the second number of dimensions that includes the predetermined first parameter value as the search space, and
change at least one of the second number of dimensions or a linear subspace associated with the affine subspace every iterated process so as to change the affine subspace of the second number of dimensions.

7. The parameter optimization apparatus according to claim 4, wherein
if the second condition is not satisfied, the processing circuitry is configured to search the same search space repeatedly for the first parameter value or the second parameter value.

8. The parameter optimization apparatus according to claim 4, wherein
the iterated process is performed as multiple tasks in parallel or in series,
the memory has a plurality of task memories corresponding to the tasks respectively,
each of the plurality of task memories is configured to accumulate a first parameter value and an observed value corresponding to the first parameter value for each task, and
each of the plurality of task memories is configured to store, if the second condition is satisfied, a first parameter value corresponding to a minimum or maximum observed value among the first parameter values stored in the plurality of task.

9. The parameter optimization apparatus according to claim 3, wherein
the processing circuitry is configured to acquire, when the first condition is satisfied, a first parameter value having a maximum or minimum observed value from data sets stored in the memory.

10. The parameter optimization apparatus according to claim 9, wherein
the iterated process is performed as multiple tasks in parallel or in series,
the memory has a plurality of task memories corresponding to the tasks respectively,
each of the plurality of task memories is configured to accumulate a first parameter value and an observed value corresponding to the first parameter value for each task, and
the processing circuitry is configured to acquire, if the first condition is satisfied, a first parameter value corresponding to a minimum or maximum observed value among the first parameter values stored in the plurality of task memories.

11. The parameter optimization apparatus according to claim 1, wherein
the processing circuitry is configured to calculate a distance between a first parameter value and the search space for each of the plurality of data sets, and acquires acquire, as the one or more first or second parameter value(s), the one or more first parameter value(s) located in the distance equal to or smaller than a threshold or the one or more second parameter value(s) of the second number of dimensions corresponding to the first parameter value(s).

12. The parameter optimization apparatus according to claim 1, wherein the threshold is a positive value.

13. The parameter optimization apparatus according to claim 11, wherein the threshold is zero.

14. The parameter optimization apparatus according to claim 3, wherein
the processing circuitry is configured to calculate a distance between a first parameter value and the search space for each of the plurality of data sets, and acquire, as the one or more first or second parameter value(s), a first parameter value located in the distance equal o or smaller than a threshold or a second parameter value of the second number of dimensions corresponding to the first parameter value, and
the threshold varies in accordance with a number of iterations of a process performed by the processing circuitry.

15. The parameter optimization apparatus according to claim 11, wherein
the processing, circuitry is configured to display a GUI screen for selecting the threshold in accordance with an instruction from a user.

16. The parameter optimization apparatus according to claim 14, wherein
the processing circuitry is configured to display a GUI screen for selecting the threshold in accordance with an instruction from a user.

17. The parameter optimization apparatus according to claim 1, wherein
the distance is the Euclidean distance, the Manhattan distance, the cosine distance, or the Mahalanobis' distance.

18. The parameter optimization apparatus according to claim 17, wherein
the processing circuitry is configured to display a GUI screen for selecting a type of the distance in accordance with instructions from a user.

19. The parameter optimization apparatus according to claim 1, wherein
the processing circuitry is configured to either extract the one or more first or second parameter values included in the predetermined distance from the search space based on the plurality of data sets, or randomly generate the one or more first or second parameter values included in the predetermined distance from the search space based on the search space of the second number of dimensions.

20. The parameter optimization apparatus according to claim 19, wherein
the processing circuitry is configured to generate one or more data set(s) that includes the one or more observed value(s) of the objective function corresponding to the one or more first parameter values or the one or more observed value(s) of the objective function corresponding to the one or more first parameter value(s) corresponding to the one or more second parameter value(s), and the one or more first or second parameter value(s), and
the memory is configured to store the generated data set(s).

21. The parameter optimization apparatus according to claim 1, wherein
the processing circuitry is configured to display a GUI screen for selecting the second number of dimensions in accordance with are instruction from a user.

22. The parameter optimization apparatus according to claim 1, wherein
the processing circuitry is configured to generate the surrogate model based on the acquired one or more data sets, and search for a first parameter value or a second parameter value that optimizes the surrogate model as a first parameter value or a second parameter value that optimizes the objective function.

23. The parameter optimization apparatus according to claim 1, wherein
the predetermined first parameter value is either one of a default value, a random value, or a first parameter value that corresponds to a minimum or maximum observed value among the first parameter values stored in the memory.

24. A parameter optimization method comprising:
determining a search space of a second number of dimensions that includes a predetermined first parameter value of a first number of dimensions, the second number being smaller than the first number;
acquiring one or more data sets each having a first parameter value included in a predetermined distance from the search space, or one or more data sets each having a second parameter value of the second number of dimensions corresponding to this data set, based on a plurality of data sets; and
searching the search space for a first parameter value or a second parameter value that optimizes an objective function, using a surrogate model of the objective function based on the acquired one or more data sets.

25. A parameter optimization system comprising:
a memory configured to store a plurality of data sets which each include a first parameter value of a first number of dimensions and an observed value of an objective function corresponding to the first parameter value: and processing circuitry configured to
- determine a search space of a second number of dimensions that includes a predetermined first parameter value, the second number being smaller than the first number,
- acquire one or more data sets each having a first parameter value included in a predetermined distance from the search space, or one or more data sets each having a second parameter value of the second number of dimensions corresponding to this data set, based on the plurality of data sets,
- search the search space for a first parameter value or a second parameter value that optimizes the objective function, using a surrogate model of the objective function based on the acquired one or more data sets,
- calculate an observed value of the objective function corresponding to the searched first parameter value or an observed value of the objective function corresponding to a first parameter value corresponding to the searched second parameter value, and
- generate a data set that includes a first parameter value corresponding to the searched first or second parameter and the calculated observed value.

* * * * *